US010701121B2

(12) United States Patent
Paul

(10) Patent No.: US 10,701,121 B2
(45) Date of Patent: Jun. 30, 2020

(54) LIVE BROADCAST ON AN ONLINE SOCIAL NETWORK

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 51 days.

(21) Appl. No.: 15/395,583

(22) Filed: Dec. 30, 2016

(65) Prior Publication Data

US 2018/0191792 A1 Jul. 5, 2018

(51) Int. Cl.
*H04L 29/06* (2006.01)
*H04L 12/58* (2006.01)
*H04L 12/26* (2006.01)
*H04L 29/08* (2006.01)

(52) U.S. Cl.
CPC ........ *H04L 65/4076* (2013.01); *H04L 51/046* (2013.01); *H04L 51/10* (2013.01); *H04L 51/32* (2013.01); *H04L 65/604* (2013.01); *H04L 65/605* (2013.01); *H04L 43/0882* (2013.01); *H04L 67/306* (2013.01)

(58) Field of Classification Search
CPC ... H04L 65/4076; H04L 65/602; H04L 51/08; H04L 51/32; H04L 43/0882; H04L 47/70; H04L 29/06; H04L 29/08
USPC .......................................................... 709/219
See application file for complete search history.

(56) References Cited

U.S. PATENT DOCUMENTS

| 5,574,934 | A | * | 11/1996 | Mirashrafi | G06Q 10/10 348/E7.082 |
| 7,873,074 | B1 | * | 1/2011 | Boland | H04L 12/14 370/468 |
| 9,166,889 | B1 | * | 10/2015 | Barbulescu | H04L 41/142 |
| 9,270,515 | B1 | * | 2/2016 | Postelnicu | G11B 27/00 |
| 9,876,831 | B1 | * | 1/2018 | Leske | H04L 51/046 |
| 2002/0144276 | A1 | * | 10/2002 | Radford | H04N 7/17318 725/87 |
| 2004/0002049 | A1 | * | 1/2004 | Beavers | G09B 5/00 434/350 |
| 2007/0097215 | A1 | * | 5/2007 | Jung | H04N 1/00137 348/207.1 |
| 2007/0098348 | A1 | * | 5/2007 | Jung | H04N 7/181 386/240 |
| 2007/0204037 | A1 | * | 8/2007 | Kunz | G06Q 30/02 709/225 |
| 2008/0195761 | A1 | * | 8/2008 | Jabri | H04L 65/605 709/250 |
| 2008/0253301 | A1 | * | 10/2008 | Keromytis | H04L 41/0896 370/252 |

(Continued)

Primary Examiner — David R Lazaro
Assistant Examiner — Berhanu Shitayewoldetadik
(74) Attorney, Agent, or Firm — Baker Botts L.L.P.

(57) ABSTRACT

In one embodiment, a method includes sending, to a social-networking system, information to initiate a live-broadcast session for distribution of a media stream using the social-networking system. The method also includes capturing an incoming media stream in association with the live-broadcast session, generating an outgoing media stream based on the incoming media stream, and sending the outgoing media stream to the social-networking system. The method also includes providing information to display a user interface associated with the live-broadcast session, where the user interface includes a visual representation associated with the outgoing media stream.

17 Claims, 12 Drawing Sheets

(56) References Cited

U.S. PATENT DOCUMENTS

| | | | | |
|---|---|---|---|---|
| 2009/0016240 | A1* | 1/2009 | Sebastian | H04L 43/0876 370/253 |
| 2009/0070294 | A1* | 3/2009 | Chijiiwa | G06Q 10/10 |
| 2009/0285092 | A1* | 11/2009 | Gutman | H04N 7/17318 370/230 |
| 2011/0276396 | A1* | 11/2011 | Rathod | G06F 17/30867 705/14.49 |
| 2012/0004960 | A1* | 1/2012 | Ma | G06Q 30/0241 705/14.4 |
| 2012/0254454 | A1* | 10/2012 | Margush | H04L 12/1827 709/231 |
| 2012/0303834 | A1* | 11/2012 | Adam | H04L 65/4084 709/231 |
| 2012/0330950 | A1* | 12/2012 | Pichumani | H04L 65/4076 707/736 |
| 2013/0103766 | A1* | 4/2013 | Gupta | G06Q 10/107 709/206 |
| 2013/0147906 | A1* | 6/2013 | Weiser | H04N 7/155 348/14.09 |
| 2013/0155882 | A1* | 6/2013 | Pendleton | H04L 43/0882 370/252 |
| 2014/0122622 | A1* | 5/2014 | Castera | H04L 51/32 709/206 |
| 2014/0195675 | A1* | 7/2014 | Silver | H04L 65/1083 709/224 |
| 2014/0297883 | A1* | 10/2014 | Srinivasan | H04L 65/4084 709/231 |
| 2015/0058448 | A1* | 2/2015 | Proctor | H04L 65/602 709/219 |
| 2015/0113159 | A1* | 4/2015 | Gogoi | H04N 21/234327 709/231 |
| 2015/0245079 | A1* | 8/2015 | Tremblay | H04H 20/18 725/116 |
| 2016/0080456 | A1* | 3/2016 | Ma | G06Q 30/0241 709/231 |
| 2016/0323351 | A1* | 11/2016 | Luthra | G06F 16/183 |
| 2016/0330258 | A1* | 11/2016 | Sandhu | H04L 65/1069 |
| 2017/0195493 | A1* | 7/2017 | Kasilya Sudarsan | H04W 88/02 |

\* cited by examiner

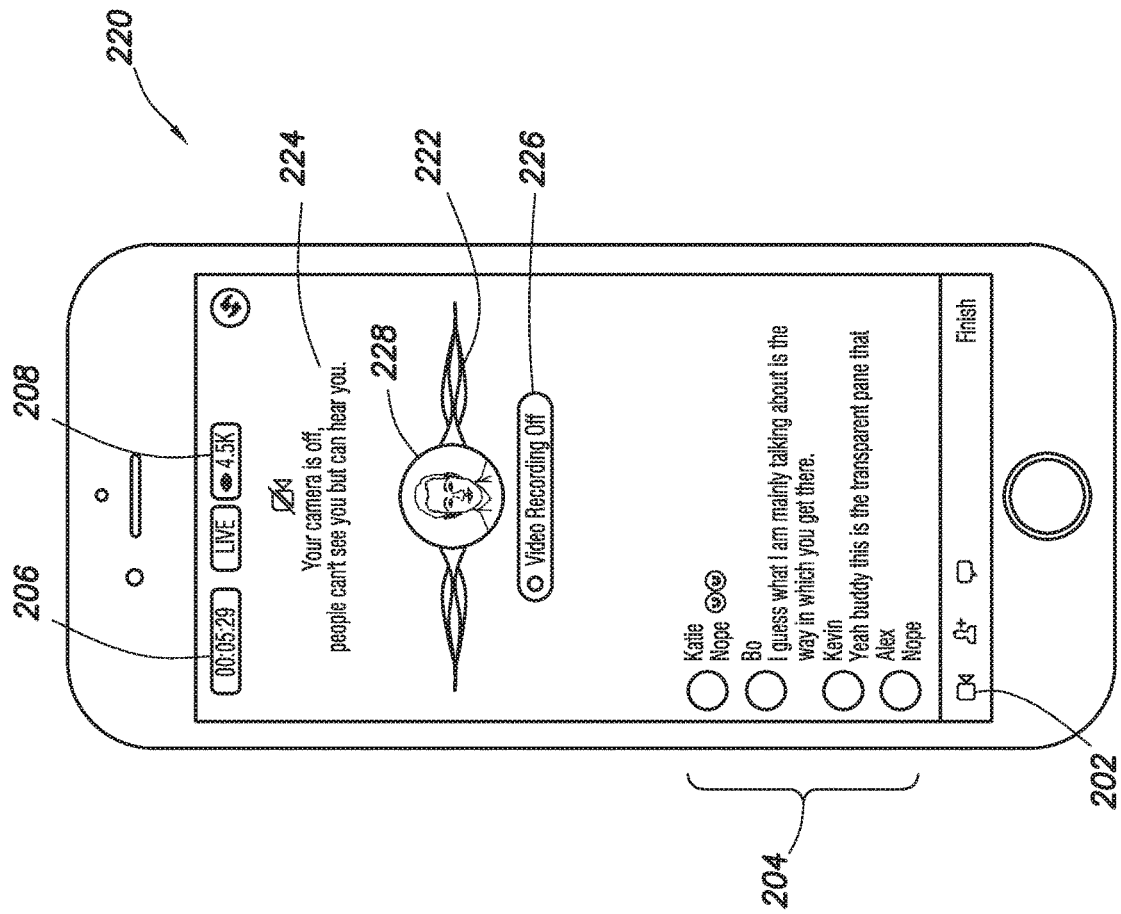
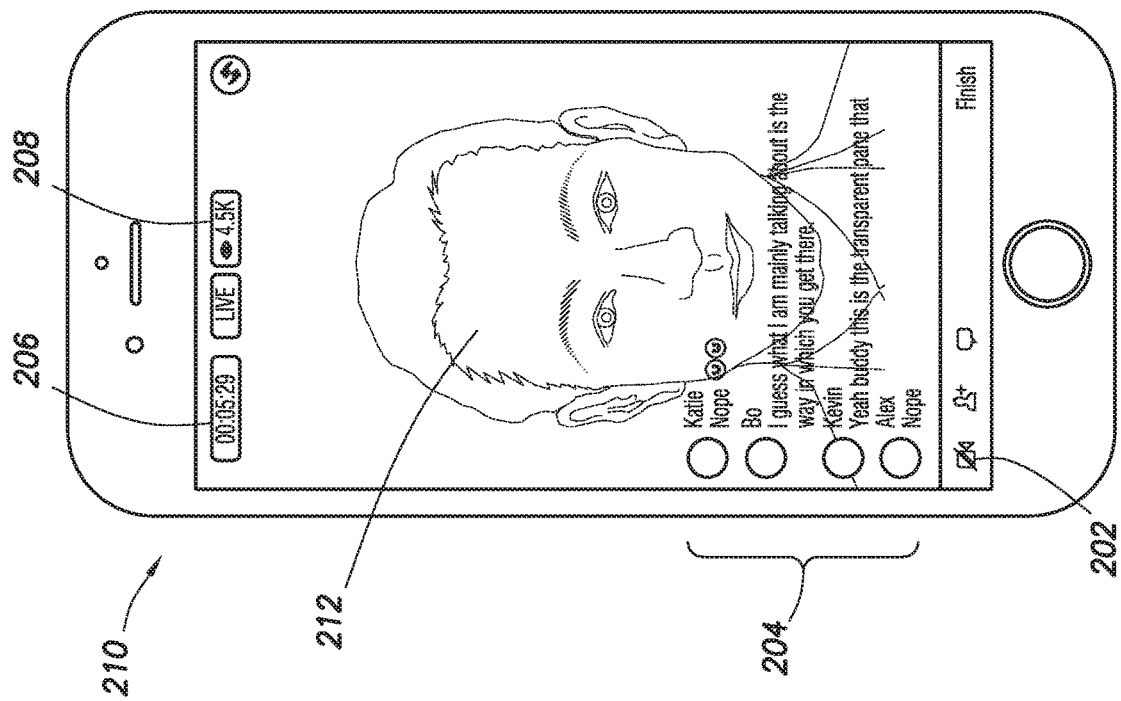
FIG. 2A
FIG. 2B

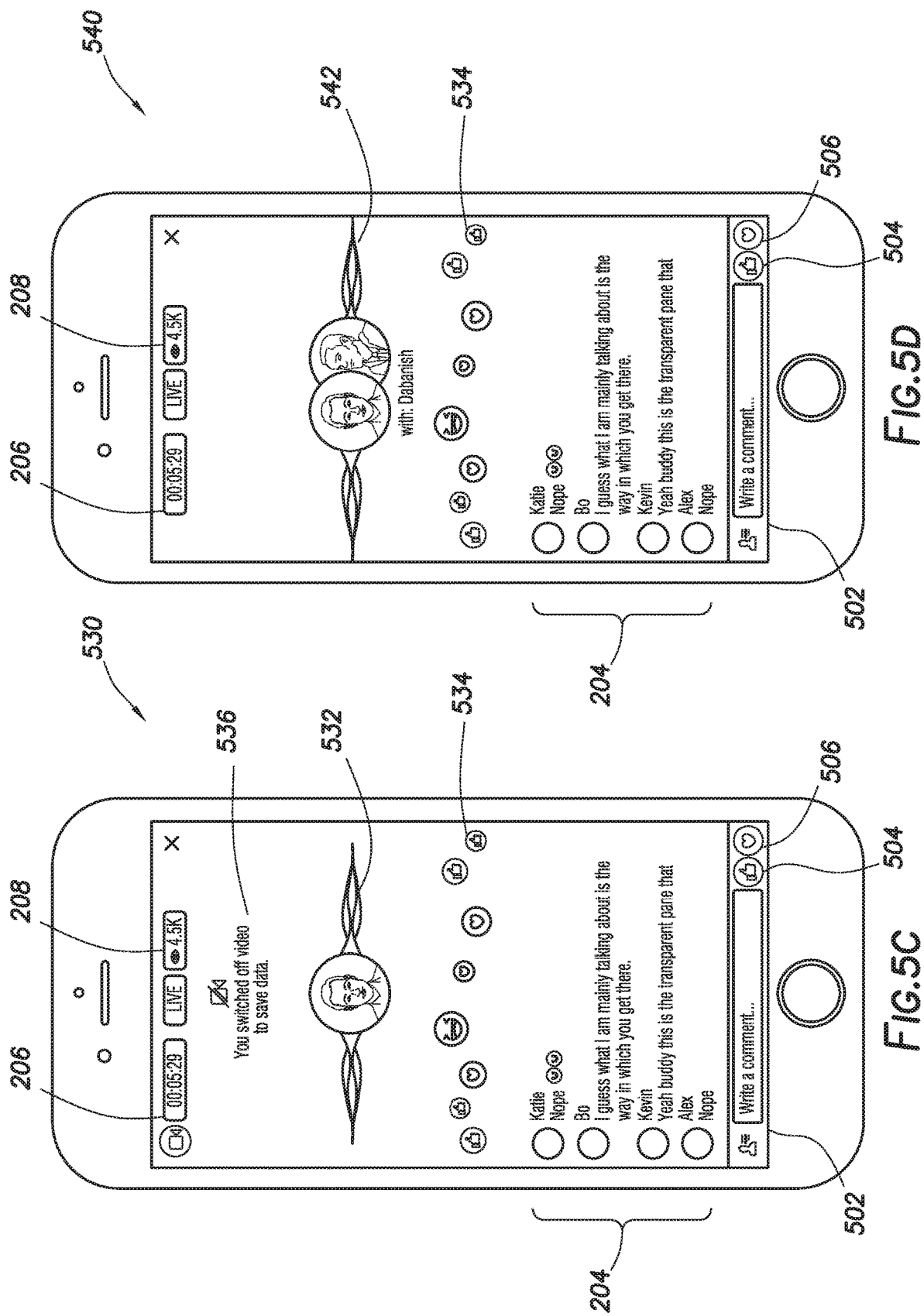

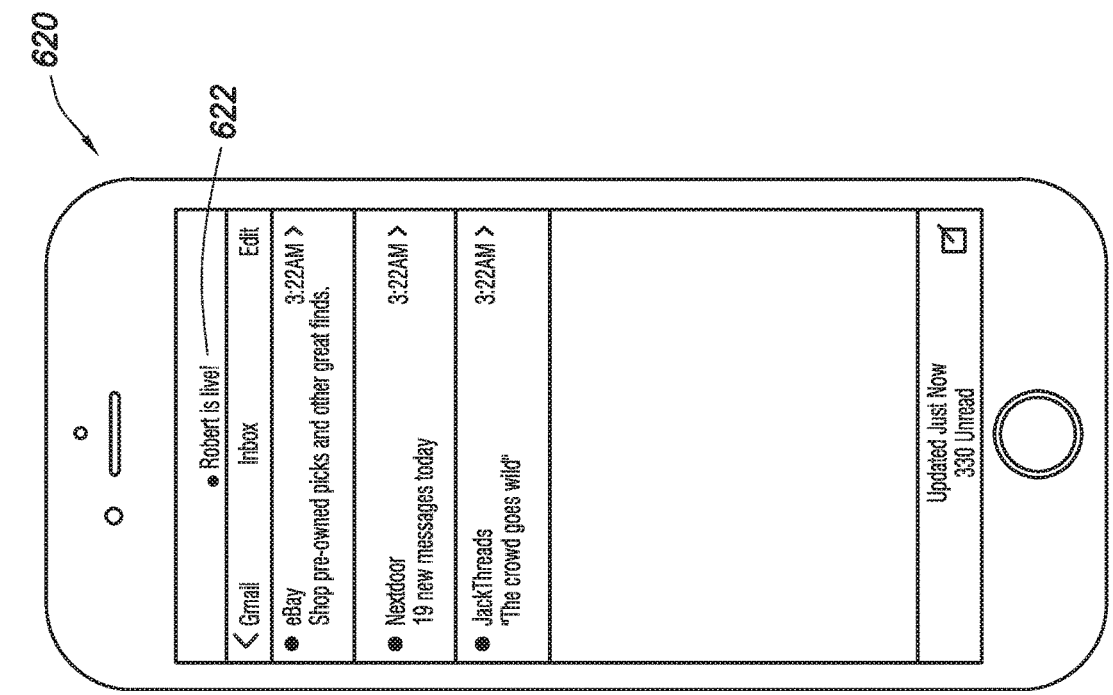
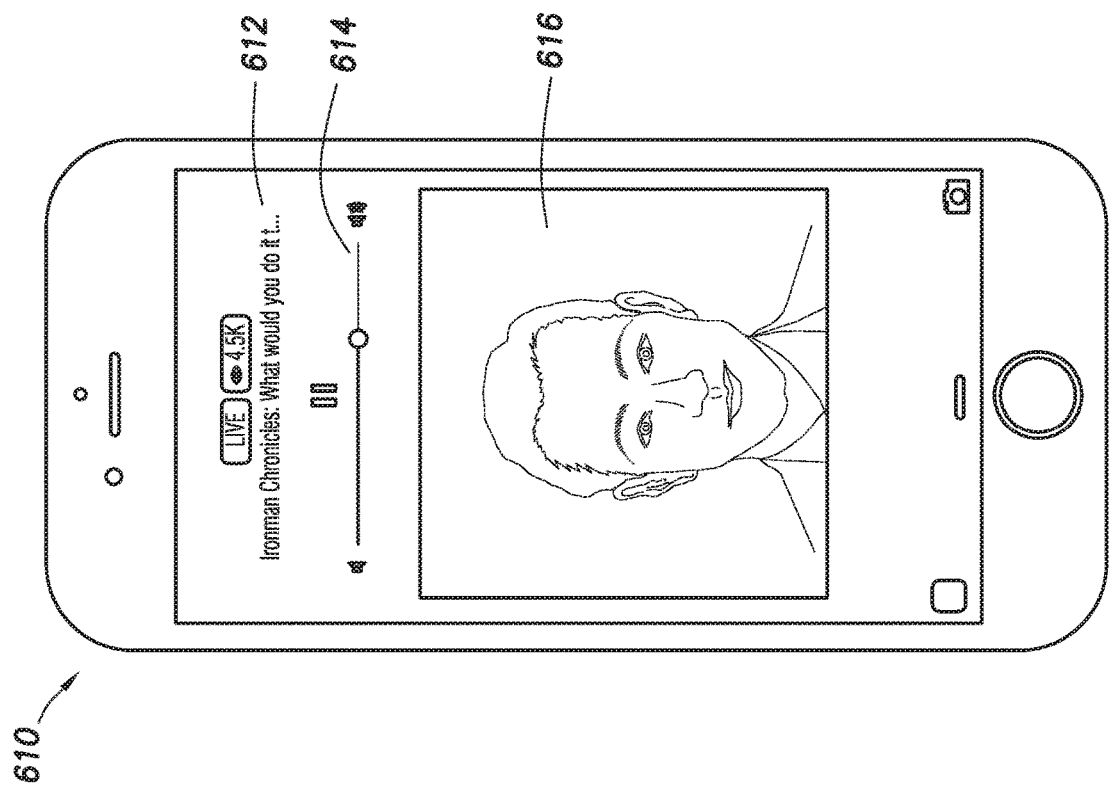
FIG.6B
FIG.6A

LIVE BROADCAST ON AN ONLINE SOCIAL NETWORK

TECHNICAL FIELD

This disclosure generally relates to providing live-broadcast service on an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may implement a live-broadcast service allowing a user to broadcast a media stream to one or more other users. The live-broadcast service may distribute the media stream in a live-broadcast session that allows one or more viewing users to react to the media stream and communicate with the broadcasting user in real time. This may create, for the viewing users, a sense of presence at a "scene" associated with the live broadcast session or a feeling of being at the same time and place as the broadcasting user. The ability of the social-networking system in steadily and smoothly receive the media stream from a client system of the broadcasting user and distribute the media stream to client systems of the viewing users is essential to such sense of presence. A disruption to the distribution of the media stream or a lowering of its quality may be harmful to user experience. The ability of the social-networking system to sustain a live-broadcast session may be limited by network connectivity status (e.g., bandwidth, network type, data usage transfer limit, stability) associated with the client systems of the broadcasting and viewing users. Given particular network connectivity status, the social-networking system may be capable of distributing media stream in particular formats (e.g., audio) with higher quality than media stream in other formats (e.g., video) because the transmission of the former media stream is less resource-consuming than the latter. In particular embodiments, the social-networking system may allow a broadcasting or viewing user to choose a format of the media stream to be broadcasted. Additionally or alternatively, a service may be provided to automatically determine a format of the media stream based at least in part on the network connectivity status. This service may be implemented at the social-networking system or one or more client systems associated with one or more users. Such functionalities may enhance the stability and quality of media streams distributed by the live-broadcast service and accordingly improve user experience in using the service.

In particular embodiments, the live-broadcast service may distribute a media stream in an audio format as a fallback option for an existing live-broadcast session showing the media stream in a video format. In response to a broadcasting user's request for a live-broadcast session in a video format, the client system associated with the broadcasting user may capture a video stream associated with the broadcasting user and send this video stream to the social-networking system. The video stream may comprise both video and audio data and provide a viewing user a combined visual and acoustic experience. The social-networking system may distribute this video stream to the client systems of one or more viewing users. During the live broadcast session, the social-networking system or one or more of the client systems may continuously detect a network connectivity status of one or more of the client systems. Based on detection of the network connectivity status, the video stream may be changed to an audio stream. As an example and not by way of limitation, if a bandwidth of a network connected to by the broadcasting user's client system falls below a threshold bandwidth needed for smoothly sending the video stream from the client system to the social-networking system, the live-broadcast service may switch to an audio mode and instruct the client system to only send an audio component of the media stream to the social-networking system. The social-networking system may accordingly distribute only the audio component to one or more client systems of viewing users. As another example and not by way of limitation, if a bandwidth of a network connected to by a viewing user's client system falls below bandwidth for receiving the video stream without disruption, the social-networking system may select an audio component of the media stream it receives from the broadcasting user's client system and send this audio component to the viewing user's client system. The viewing user will thereby experience an audio part of the live broadcast. As shown in both examples, by switching the live broadcast to an audio mode rather than suspending or terminating the live broadcast when network connection is weak, particular embodiments disclosed herein may provide broadcasting and viewing users a continuous real-time communication experience and improve their sense of presence at the scene associated with the live-broadcast session.

In particular embodiments, the live-broadcast service may comprise an audio live broadcast service. The audio live broadcast service may serve as a standalone alternative option to a video live broadcast service. In particular embodiments, the live-broadcast service may prompt a user to create either a video live broadcast or an audio live broadcast. The live-broadcast service may also allow the broadcasting user to switch from one format of the service to another format during a live broadcast session. The broadcasting user may select a format based on, for example, a network connectivity status associated with the user's client system, capabilities of the client system (e.g., ability to capture video data), or personal preferences (e.g., whether the broadcasting user would like to be seen by others). Similarly, when a media stream associated with a live-broadcast session is available in both a video format and an audio format, the live-broadcast service may provide a viewing user options to consume the live broadcast in either of the formats. The viewing user may choose the audio format, for example, to save cellular data, to avoid distraction of attention by a video (e.g., when driving), or to simultaneously use another application on the same client system. The audio mode of the live-broadcast sessions may comprise one or more customized user interface features different from those associated with the video mode. Although this disclosure describes broadcasting a media stream associated with a user in one or more formats to one or more other users in a particular manner, this disclosure contemplates broadcasting a media stream associated with a user in one or more formats to one or more other users in any suitable manner.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A-2B illustrate example live-broadcast interfaces provided for display on a client system associated with a broadcasting user.

FIGS. 5A-5D illustrate example live-broadcast interfaces provided for display on a client system associated with a viewing user.

FIGS. 6A-6B illustrate example simplified user interfaces displayed on a client system associated with a viewing user of a live-broadcast session.

DESCRIPTION OF EXAMPLE EMBODIMENTS

Figure 1A:
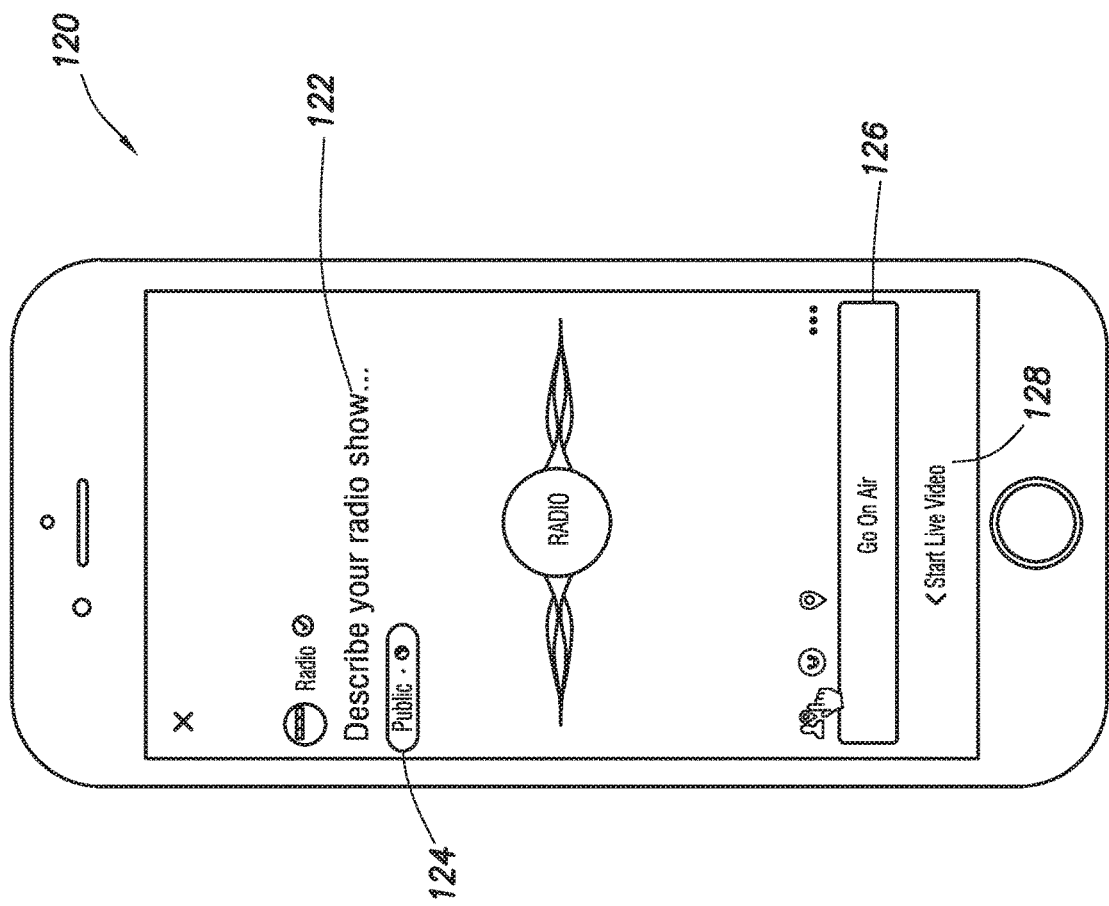
FIGS. 1A-1B illustrate example preview interfaces allowing a broadcasting user to select a format in which to initiate a live-broadcast session.

In particular embodiments, the social-networking system may implement a live-broadcast service allowing a user to broadcast a media stream to one or more other users. The live-broadcast service may distribute the media stream in a live-broadcast session that allows one or more viewing users to react to the media stream and communicate with the broadcasting user in real time. This may create, for the viewing users, a sense of presence at a "scene" associated with the live broadcast session or a feeling of being at the same time and place as the broadcasting user. The ability of the social-networking system in steadily and smoothly receive the media stream from a client system of the broadcasting user and distribute the media stream to client systems of the viewing users is essential to such sense of presence. A disruption to the distribution of the media stream or a lowering of its quality may be harmful to user experience. The ability of the social-networking system to sustain a live-broadcast session may be limited by network connectivity status (e.g., bandwidth, network type, data usage transfer limit, stability) associated with the client systems of the broadcasting and viewing users. Given particular network connectivity status, the social-networking system may be capable of distributing media stream in particular formats (e.g., audio) with higher quality than media stream in other formats (e.g., video) because the transmission of the former media stream is less resource-consuming than the latter. In particular embodiments, the social-networking system may allow a broadcasting or viewing user to choose a format of the media stream to be broadcasted. Additionally or alternatively, a service may be provided to automatically determine a format of the media stream based at least in part on the network connectivity status. This service may be implemented at the social-networking system or one or more client systems associated with one or more users. Such functionalities may enhance the stability and quality of media streams distributed by the live-broadcast service and accordingly improve user experience in using the service.

In particular embodiments, the live-broadcast service may distribute a media stream in an audio format as a fallback option for an existing live-broadcast session showing the media stream in a video format. In response to a broadcasting user's request for a live-broadcast session in a video format, the client system associated with the broadcasting user may capture a video stream associated with the broadcasting user and send this video stream to the social-networking system. The video stream may comprise both video and audio data and provide a viewing user a combined visual and acoustic experience. The social-networking system may distribute this video stream to the client systems of one or more viewing users. During the live broadcast session, the social-networking system or one or more of the client systems may continuously detect a network connectivity status of one or more of the client systems. Based on detection of the network connectivity status, the video stream may be changed to an audio stream. As an example and not by way of limitation, if a bandwidth of a network connected to by the broadcasting user's client system falls below a threshold bandwidth needed for smoothly sending the video stream from the client system to the social-networking system, the live-broadcast service may switch to an audio mode and instruct the client system to only send an audio component of the media stream to the social-networking system. The social-networking system may accordingly distribute only the audio component to one or more client systems of viewing users. As another example and not by way of limitation, if a bandwidth of a network connected to by a viewing user's client system falls below bandwidth for receiving the video stream without disruption, the social-networking system may select an audio component of the media stream it receives from the broadcasting user's client system and send this audio component to the viewing user's client system. The viewing user will thereby experience an audio part of the live broadcast. As shown in both examples, by switching the live broadcast to an audio mode rather than suspending or terminating the live broadcast when network connection is weak, particular embodiments disclosed herein may provide broadcasting and viewing users a continuous real-time communication experience and improve their sense of presence at the scene associated with the live-broadcast session.

In particular embodiments, the live-broadcast service may comprise an audio live broadcast service. The audio live broadcast service may serve as a standalone alternative option to a video live broadcast service. In particular embodiments, the live-broadcast service may prompt a user to create either a video live broadcast or an audio live broadcast. The live-broadcast service may also allow the broadcasting user to switch from one format of the service to another format during a live broadcast session. The broadcasting user may select a format based on, for example, a network connectivity status associated with the user's client system, capabilities of the client system (e.g., ability to capture video data), or personal preferences (e.g., whether the broadcasting user would like to be seen by others). Similarly, when a media stream associated with a live-broadcast session is available in both a video format and an audio format, the live-broadcast service may provide a viewing user options to consume the live broadcast in either of the formats. The viewing user may choose the audio format, for example, to save cellular data, to avoid distraction of attention by a video (e.g., when driving), or to simultaneously use another application on the same client system. The audio mode of the live-broadcast sessions may comprise one or more customized user interface features different from those associated with the video mode. Although this disclosure describes broadcasting a media stream associated with a user in one or more formats to one or more other users in a particular manner, this disclosure contemplates broadcasting a media stream associated with a user in one or more formats to one or more other users in any suitable manner.

In particular embodiments, a client system associated with a user may send, to the social-networking system, information to initiate a live-broadcast session for distribution of a media stream using the social-networking system. In particular embodiments, the live-broadcast service associated with the social-networking system may be made available to the user via an application associated with the social-networking system installed and run on the client system or a browser on the client system displaying a web interface associated with the social-networking system. The client system may bring up a preview interface in response to the user's input requesting access to the live-broadcast service. The preview interface may comprise one or more interactively elements for the user to, for example, input information (e.g., title, time, location) associated with a live-broadcast session, specify one or more settings (e.g., privacy, format) associated with the live-broadcast session, inputting a request to start the live-broadcast session, or perform another action associated with the live-broadcast session.

Figure 1B:
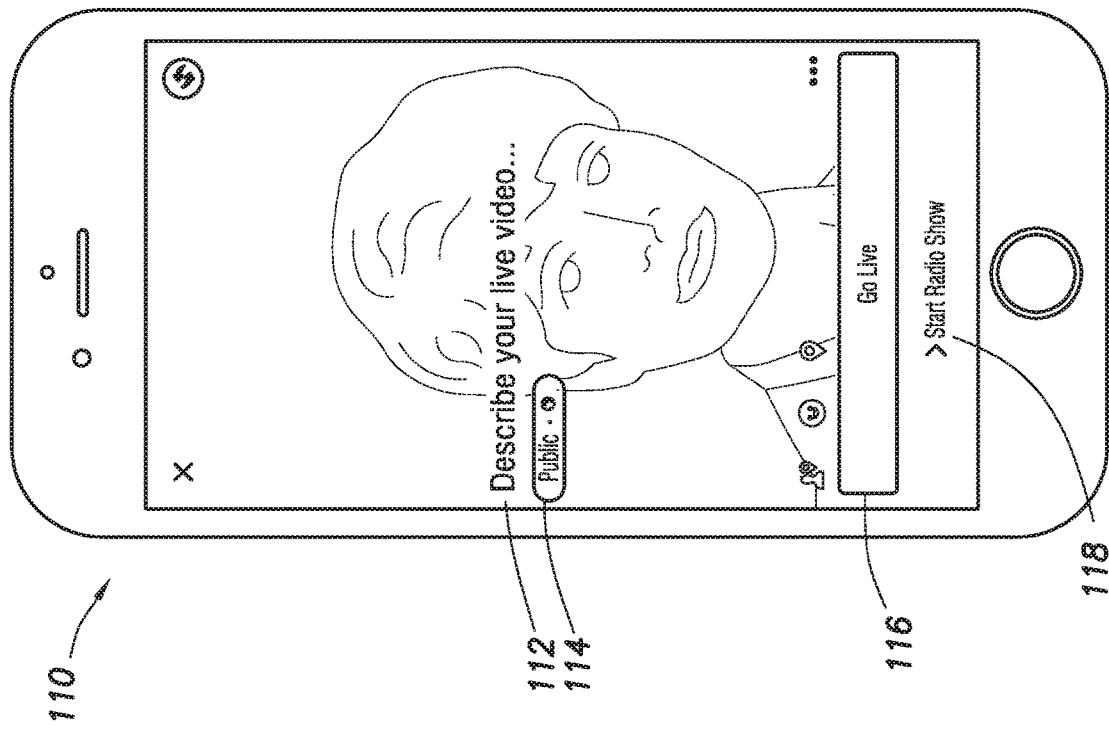

FIGS. 1A-1B illustrate example preview interfaces allowing a broadcasting user to select a format in which to initiate a live-broadcast session. As an example and not by way of limitation, in response to a user input requesting access to the live-broadcast service, the client system of the user may provide for display a preview interface 110 for initiating a live video broadcast. The preview interface 110 may comprise a title field 112, in which the user may input a title for the live-broadcast session, and a privacy field 114, which may be modified by the user to set privacy settings for the live-broadcast session (e.g., public, friends only). The preview interface 110 may further comprise a button 116 corresponding to starting the live-broadcast session. If the user interacts with the button 116 by, for example, pressing on it, the live-broadcast service may initiate a live-broadcast session in video format. The preview interface 110 may also comprise a switch button 118 for switching to a preview interface 120 for initiating a live audio broadcast. If the user interacts with this switch button 118, the client system may provide for display the preview interface 120. The preview interface 120 may comprise a title field 122, in which the user may input a title for the live-broadcast session, and a privacy field 124, which may be modified by the user to set privacy settings for the live-broadcast session. The preview interface may further comprise a button 126 corresponding to starting the live-broadcast session. If the user interacts with the button 126 by, for example, pressing on it, the live-broadcast service may initiate a live-broadcast session in audio format. The preview interface 120 may also comprise a switch button 128 for switching to the preview interface 110 for initiating a live video broadcast. If the user interacts with this switch button 128, the client system may provide for display the preview interface 110. Although FIGS. 1A-1B illustrate particular preview interfaces associated with a live-broadcast service, this disclosure contemplates any suitable preview interfaces associated with a live-broadcast service.

In particular embodiments, the client system associated with the user may send to the social-networking system, in response to user input, information to initiate a live-broadcast session. The information may comprise a specification as to a format (e.g., video, audio) of the live-broadcast session. The social-networking system may initiate the requested live-broadcast session and send to the client system a corresponding user interface for display. FIGS. 2A-2B illustrate example live-broadcast interfaces provided for display on a client system associated with a broadcasting user. As shown in FIG. 2A, in response to information received from the client system specifying the video format for a live-broadcast session, the social-networking system may send the live-broadcast interface 210 to the client system for display. The live-broadcast interface 210 may comprise a video field 212 showing a video currently captured by a camera associated with the client system. In this particular example, the video captured may show the user's face. The live-broadcast interface 210 may further comprise a reaction field 204 displaying reaction information associated with one or more other users viewing the live broadcast. The reaction field 204 may display, for example, one or more text strings, one or more emoticons, one or more other information objects inputted by one or more viewing users, or any combination thereof. The live-broadcast interface 210 may comprise a timer 206 indicating a length of time that the current live-broadcast session is in place and a headcount icon 208 indicating a number of users viewing the live broadcast. It may also comprise a camera button 202. The broadcasting user may interact with the camera button 202 to deactivate the camera associated with the client system and switch the live-broadcast session to an audio mode.

FIG. 2B illustrates a live-broadcast interface 220 associated with the audio mode. Because the camera associated with the client system has been turned off by the broadcasting user, this interface 220 may not comprise the video field 212. Instead, the live-broadcast interface 220 may comprise an image 228 associated with the broadcasting user and an animation 222 representing an audio stream captured by the client system. The live-broadcast interface 220 may also comprise a notice 224 indicating that a video is not available to the viewing users and a notice 226 indicating that the client system is not recording a video associated with the current live-broadcast session. In the live-broadcast interface, the broadcasting user may interact with the camera button 202 to activate the camera associated with the client system and switch the live-broadcast session to the video mode. Although FIGS. 2A-2B illustrate particular live-broadcast interfaces comprising particular elements, this disclosure contemplates any suitable live-broadcast interfaces comprising any suitable elements.

In particular embodiments, after a live-broadcast session has been initiated, the client system associated with the broadcasting user may capture an incoming media stream in association with the live-broadcast session. The client system my capture the incoming media stream using one or more I/O devices (e.g., video camera, microphone). The one or more I/O devices may be integrated in the client system or be independent and connected to the client system. The incoming media stream may comprise, for example, audio data, video data, other suitable data, or any combination thereof.

In particular embodiments, the client system associated with the broadcasting user may generate an outgoing media stream based on the incoming media stream. The outgoing media stream may be in the same format as or identical to the incoming media steam. Alternatively, the outgoing media stream may comprise part of the incoming media stream. As an example and not by way of limitation, for an incoming media stream comprising both audio and video data, the client system may generate the second media stream by removing the video data and retaining the audio data. In this case, the outgoing media stream may be an audio stream.

In particular embodiments, the client system associated with the broadcasting user may determine a format in which to generate the outgoing media stream based at least in part on a network connectivity status associated with the client system. Alternatively or additionally, the client system may determine the format based at least in part on an input signal to the client system indicating selection of a particular format. This determination may alternatively be performed by the social-networking system based at least in part on information received from the client system. The client system may generate the outgoing media steam based on instructions received from the social-networking system.

As an example and not by way of limitation, the live-broadcast service may automatically determine the format based on a bandwidth of a network that the client system is connected to. The client system may detect, measure, or record bandwidth values associated with the network over time. It may compare the detected values with a threshold bandwidth value and determine whether the actual bandwidth is greater than the threshold. The threshold value may be stored at the client system, received from the social-networking system, or determined in real time based on the quality of media transmission from the client system. If the detected bandwidth is less than the threshold value, the live-broadcast service may determine that the network connection of the client system is not fast enough to sustain a live video broadcast. It may determine that the audio format is appropriate for the current network connection. The client system may thereby generate an audio stream as the outgoing media stream. On the other hand, if the detected bandwidth is greater than the threshold value, the live-broadcast service may determine that the speed of the network connection is sufficient for transmission of video data. It may accordingly instruct the client system to maintain the outgoing media stream identical to the incoming media stream.

As another example and not by way of limitation, the live-broadcast service may determine the format based on an explicit user input. As shown in FIGS. 1A-1B, the client system may prompt the user to choose a format for an upcoming live-broadcast session. Additionally, the client system may receive an input from the broadcasting user during a live-broadcast session. The input may comprise, for example, an interaction with the camera button 202 in the live-broadcast interfaces 210 and 220. The live-broadcast service may determine the format for the outgoing media stream based on the user's input. Based on the determination, the client system may generate the outgoing media stream consistent with the determined format and provide for display a user interface comprising the media stream in the determined format.

As yet another example and not by way of limitation, the live-broadcast service may determine the format based on signals detected by the social-networking system. Before or during a live-broadcast session, the social-networking system may detect, measure, or record a packet rate or a packet-loss rate associated with communications with the broadcasting user's client system over time. The social-networking system may compare the packet rate or packet-loss rate with one or more corresponding threshold values. If the social-networking system determines that the packet rate is less than a threshold value or that the packet-loss rate is greater than a threshold value, it may determine that the communication channel between the social-networking system and the client system is not sufficiently fast or stable to sustain smooth transmission of a video stream. It may therefore send instructions to the client system so that the client system generates the outgoing media treat in the audio format. On the other hand, if the social-networking system determines that the packet rate or packet-loss rate satisfies the respective threshold value, it may send instructions to the client system indicating that a live-video-broadcast session is available.

In particular embodiments, the live-broadcast service may be executed by the social-networking system or the client system. The determination of the media stream's format may be performed by the social-networking system or the client system. Such determination may be facilitated by transmission of network connectivity status data, user input data, or other informative data between the social-networking system and the client system. Instructions and requests regarding, for example, the format of the outgoing media stream, the mode of the live-broadcast session, or the user interface to be displayed may also be exchanged between the social-networking system and the client system. In particular embodiments, the determination of the outgoing media stream's format may be performed before or during the live-broadcast session. The live-broadcast service may prompt the user to choose a format or inform the user of an automatically chosen format before a live-broadcast session and initiate the session in the format. Alternatively, the live-broadcast service may automatically determine the format in real time during streaming and provide the live-broadcast session in a way determined to optimize user experience (e.g., providing video whenever possible, avoiding suspension or termination of live broadcast). It may also allow the broadcasting user to freely switch between audio and video modes during streaming. Although this disclosure describes generating a particular outgoing media stream in particular formats in a particular manner, this disclosure contemplates generating any suitable outgoing media stream in any suitable formats in any suitable manner.

In particular embodiments, the live-broadcast service may control the timing of switching between different modes of the live-broadcast session using a fluctuation-control module. As an example and not by way of limitation, if the outgoing media stream is automatically changed from the video format to the audio format due to a decrease in the bandwidth of a network connected to by the broadcasting user's client system, it may be desirable to bring the media stream back to a video stream if the bandwidth increases back to a satisfactory level. However, it may not be worthwhile to switch back to the video mode if the bandwidth only stays high for a short period of time, as frequent switching between the audio and video modes may hurt user experience. The fluctuation-control module may receive network connectivity data from the client system and dynamically determine whether and when to switch from one mode of the live broadcast to the other. The fluctuation-control module may reduce potential detriment to user experience caused by fluctuations in network connectivity. Specifically, the client system associated with the broadcasting user may measure one or more bandwidth values associated with a network connection of the client system, each bandwidth value being associated with a time of its measurement. The live-broadcast service may determine that each of one or more of the bandwidth values within a period of time of a specified length are greater than a threshold bandwidth value. It may instruct the client system to switch from generating the outgoing media stream in a format not comprising video data to generating the outgoing media stream in a format comprising video data based at least in part on the determination.

Figure 3:
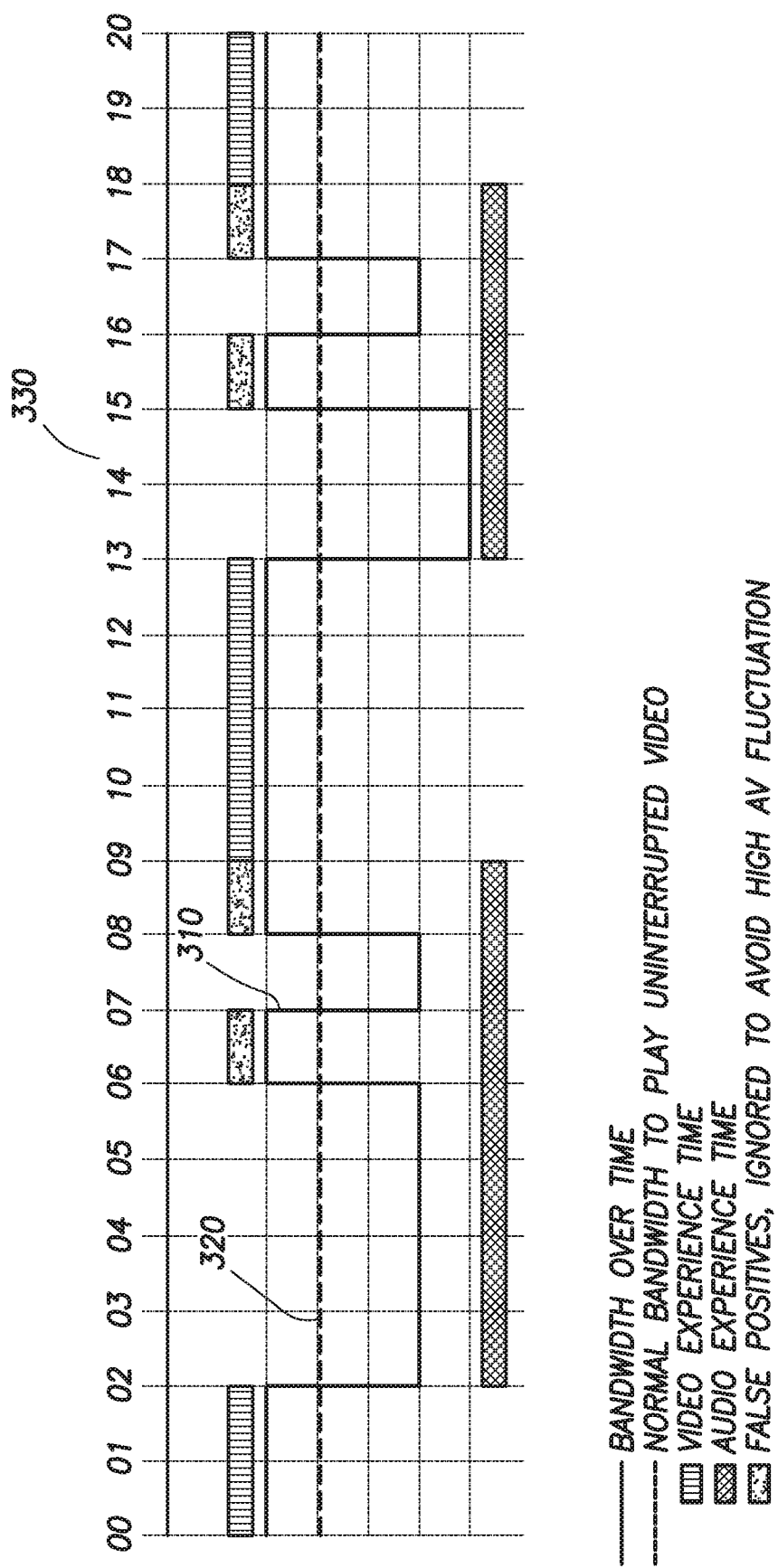
FIG. 3 illustrates, in a timeline, switching of an example live-broadcast session between audio and video modes as controlled by a fluctuation-control module.

FIG. 3 illustrates, in a timeline, switching of an example live-broadcast session between audio and video modes as controlled by a fluctuation-control module. Within FIG. 3, the line 310 represents bandwidth values of a network connection associated with the client system over time. The line 320 represents a threshold bandwidth value. If the bandwidth of the client system falls below the threshold bandwidth value, the network connection is determined to not be fast enough to sustain a live video broadcast. The coordinate 330 represents a plurality of time points; the time values may correspond to any suitable unit of time. For simplicity purposes, the coordinate 330 may be interpreted as representing a time period from 0 second (s) to 20 s. As illustrated by FIG. 3, the bandwidth value 310 may be greater than the threshold 320 from 0 s to 2 s. During this period, the fluctuation-control module may instruct the client system to generate the media stream in the video format. At 2 s, the bandwidth 310 may suddenly drop below the threshold 320. Because the resulting bandwidth is not sufficient for a live-video-broadcast session without disruptions, the fluctuation-control module may instruct the client system to immediately switch to the audio mode and generate the outgoing media stream in the audio format. At 6 s, the bandwidth 310 may raise above the threshold 320. Although this bandwidth is sufficient for providing the live broadcast in the video format, the fluctuation-control module may enforce a specified delay (e.g., 1 s) to ensure that the bandwidth is likely stabilized at its current value and prevent the client system from switching back to the video mode. At 7 s, the bandwidth 310 may drop back below the threshold 320 before the delay enforced by the fluctuation-control module expires. Therefore, the fluctuation-control module prevents an unnecessary fluctuation in the live-broadcast session between 6 s and 7 s. At 8 s, again, the bandwidth 310 may raise above the threshold 320. The fluctuation-control module may enforce the 1 s delay again and instruct the client system to generate an outgoing audio stream until 9 s, when the delay expires. The client system may be instructed to generate the media stream in the video format from 9 s to 13 s, when the bandwidth 310 drops back below the threshold 320. This process may continue as shown on FIG. 3. In this example, the length of the delay applied by the fluctuation-control module may be optimized based on historical data collected by the fluctuation-control module. It may be any suitable value. Although FIG. 3 illustrates a particular timeline of switching between the audio and video modes, this disclosure contemplates any suitable timeline of switching between the audio and video modes.

In particular embodiments, the client system associated with the broadcasting user may send the outgoing media stream to the social-networking system. The social-networking system may then distribute the received media stream to one or more client systems associated with one or more viewing users in real time. The viewing users may have requested access to the live-broadcast session. Additionally or alternatively, the social-networking system may buffer the received media stream before distributing it to the client systems associated with the viewing users. In particular embodiments, the client system associated with the broadcasting user may directly send the outgoing media stream to one or more client systems associated with one or more viewing users without sending the media stream to the social-networking system. This arrangement may be particularly efficient if the client systems are connect to each other by a mesh network or a local area network. Specifically, the client system associated with the broadcasting user may receive instructions from the social-networking system to distribute the outgoing media stream to one or more client systems associated with viewing users. The instructions may comprise, for example, identification information or network address information of the client systems. Based on the instructions, the client system associated with the broadcasting user may send the outgoing media stream to the one or more other client systems identified by the social-networking system. Although this disclosure describes sending the outgoing media stream in a particular manner, this disclosure contemplates sending the outgoing media stream in any suitable manner.

In particular embodiments, the live-broadcast service may provide information to display a user interface associated with the live-broadcast session on the client system associated with the broadcasting user. Examples of the user interface are illustrated by FIGS. 2A-2B. The user interface may comprise a visual representation associated with the outgoing media stream. If the outgoing media stream is in the video format, the visual representation associated with the outgoing media stream may comprise the video stream 212. If the outgoing media stream is in the audio format, the visual representation associated with the outgoing media stream may comprise an animation 222 associated with the audio stream. In this case, the user interface 220 may also comprise an image 228 associated with the broadcasting user. The user interface may further comprise reaction information 204 associated with one or more viewing users of the live-broadcast session. The reaction information 204 may comprise one or more graphic emoticons, one or more comments, one or more indications of likes by the viewing users, other reaction information, or any combination thereof. The user interface may further comprise a menu bar comprising one or more selectable icons allowing the broadcasting user to modify one or more settings associated with the live-broadcast session or access one or more functionalities of the live-broadcast service. The components of the user interface may be organized within one or more fields such as, for example, a video stream field, an animation and cover image field, a live reactions field, a comments field, a control field, another suitable field, or any combination thereof. In particular embodiments, a visual representation of an audio stream may occupy a smaller area of the user interface than a visual representation of a video stream; this may allow one or more other components to occupy a larger area of the user interface. As an example and not by way of limitation, the live-broadcast service may display more comments in a user interface displaying an animation of an audio stream than a user interface directly displaying a video stream.

In particular embodiments, the image associated with the broadcasting user displayed within the user interface may comprise a cover image provided by the broadcasting user and stored by the social-networking system or the client system. Prior to or during a live-broadcast session, the live-broadcast service may prompt the broadcasting user to upload or select an image as a cover image associated with the live-broadcast functionality. The cover image may be stored in one or more data stores associated with the social-networking system or the client system associated with the broadcasting user. The cover image may be displayed within the user interface when a live-broadcast session is initiated or when the live-broadcast session switches to the audio mode. Alternatively, in case the live-broadcast session switches from the video mode to the audio mode, the user interface may capture a screenshot of the last frame of the video stream and display this captured image in the user interface. The live-broadcast service may apply one or more changes to the captured image before providing it for display in the user interface. As an example and not by way of limitation, the live-broadcast service may apply a blurring effect to the captured image and display the blurred image as a background superposing the audio animation. As an example and not by way of limitation, the live-broadcast service may reduce the size of the captured image and display is in the form of a profile image associated with the broadcasting user.

In particular embodiments, the live-broadcast service may provide animation associated with an audio stream in one of one or more different shapes (e.g., pulsating dot, undulating wave). The animation may be color coded. It may visually represent one or more features of the audio stream (e.g., volume, pitch). A sounds visualization engine may be used to generate multiple different types of audio animation of varying level of fidelity, reactiveness, level of processing power consumption. Different types of audio animation may be created in a customized manner based on, for example, categories of audio content, identities of broadcasting users, demographical information associated with broadcasting users, other suitable factors, or any combination thereof. In particular embodiments, the live-broadcast service may prompt the broadcasting user to select a particular type of animation to be displayed in the user interface on the client system associated with the broadcasting user or one or more user interfaces displayed on one or more client systems associated with one or more viewing users. Alternatively, the live-broadcast service may automatically select a type of animation for a particular live-broadcast session. The selection may be based on capabilities or status of the broadcasting user's client system. As an example and not by way of limitation, a type of audio animation with complex features, high fidelity, and quick reactiveness may be selected for a client system having large available memory. On the other hand, a minimalist type of audio animation may be selected for a client system with relatively weak processing capabilities. Although this disclosure describes providing information to display a particular user interface in a particular manner, this disclosure contemplates providing information to display any suitable user interface in any suitable manner.

In particular embodiments, the client system associated with the broadcasting user may record the audio data and the video data of the incoming media stream and store the recorded data in one or more data stores associated with the client system. It may then send a media object comprising the stored data associated with the incoming media stream to the social-networking system for display in a web interface associated with the broadcasting user. In particular embodiments, the media object may comprise a full recording of the incoming media stream. It may be posted, for example, on a timeline associated with the broadcasting user's account on the social-networking system. The live-broadcast service may generate additional information associated with the live broadcast, such as captions corresponding to the audio data, for display along with the media object. Switching between the video mode and the video mode of a live-broadcast session may or may not affect a media object recorded based on the live-broadcast session.

As an example and not by way of limitation, after switching from generating an outgoing media stream in the video format to generating the outgoing media stream in the audio format due to bandwidth limitations, the client system associated with the broadcasting user may nonetheless continue to record both video and audio data locally. This local recordation of the media stream is not limited by the bandwidth of the network connection between the client system and the social-networking system. The user interface displayed to the broadcasting user may specifically and clearly indicate that video is still being recorded even if the live-broadcast session has been switched to the audio mode. After the live-broadcast session and preferentially when a high-quality network connection is available, the client system may send the recorded media object to the social-networking system for display. This method may provide users viewing the recorded live-broadcast session on the social-networking system a full live experience without interruptions by issues such as network connectivity fluctuations.

As another example and not by way of limitation, the live-broadcast service may be configured to interpret a broadcasting user's explicit selection to have a live-broadcast session in the audio mode as an indication that the user is unwilling to have video recorded. When initiating the live-broadcast session, the live-broadcast service may cause the client system of the broadcasting user to turn off one or more camera associated with the client system. The client system may record purely audio data associated with the live-broadcast session and send an audio media object to the social-networking system for display.

As yet another example and not by way of limitation, the client system associated with the broadcasting user may display, in the user interface associated with the live-broadcast session, an interactive element (e.g., a button) associated with camera options. The broadcasting user may interact with the interactive element to turn on or turn off one or more cameras associated with the client system before or during a live-broadcast session. The user interface may further comprise one or more indicators indicating whether video data is being recorded. The recorded media object in this case may comprise a mixture of audio and video data based on the user's actions during the live-broadcast session. Although this disclosure describes recording and sending a media object associated with the incoming media stream in a particular manner, this disclosure contemplates recording and sending a media object associated with the incoming media stream in any suitable manner.

Figure 4:
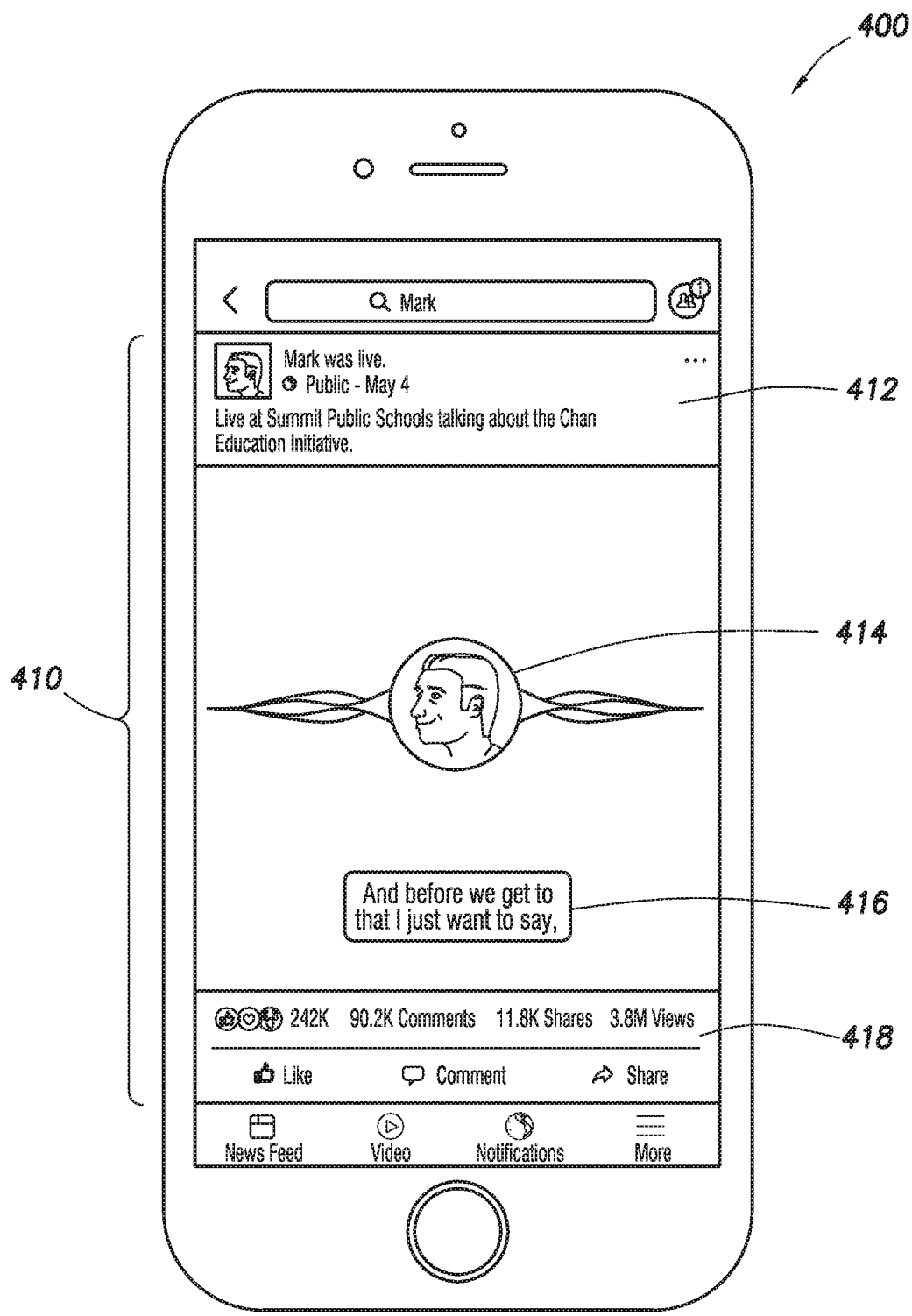
FIG. 4 illustrates an example web interface associated with a broadcasting user displaying an example media object associated with a live-broadcast session.

FIG. 4 illustrates an example web interface associated with a broadcasting user displaying an example media object associated with a live-broadcast session. In particular embodiments, a client system associated with a broadcasting user may record a live broadcast in the audio format. It may send a media object comprising the recorded data to the social-networking system for display in a web interface associated with the broadcasting user. As an example and not by way of limitation, the social-networking system may display the media object in a timeline interface 400 associated with the broadcasting user as a post. The post may comprise a title field 412 displaying, for example, identification information associated with the broadcasting user, date of the live-broadcasting session, privacy settings associated with the media object, and a title created by the broadcasting user. The post may further comprise a visual representation field 414, which may display, for example, an animation associated with the audio record and a cover image associated with the broadcasting user. The live-broadcast service may have generated captions corresponding to the audio record. The captions may have been generated using a speech-recognition algorithm. The captions may alternatively have been provided or inputted by the broadcasting user. The social-networking system may display captions 416 as part of the post. The post may also comprise a reaction information field 418, which displays, for example, information associated with views, comments, likes, or shares associated with the media object. Although FIG. 4 illustrates a particular web interface displaying a particular media object associated with a live-broadcast session, this disclosure contemplates any suitable web interface display any suitable media object associated with a live-broadcast session.

In particular embodiments, a client system associated with a viewing user may send to the social-networking system a request to access a live-broadcast session associated with a broadcasting user. The live-broadcast session may comprise a media stream. The media stream may be available in the video format or the audio format. In particular embodiments, in response to information received from the client system associated with the broadcasting user to initiate a live broadcast session, the social-networking system may initiate the live-broadcast session based on the received information. It may provide the live-broadcast session on one or more web interfaces associated with the broadcasting user. It may further send a notification about the live-broadcast session to client systems associated with one or more other users of the social-networking system. The recipients of the notification may be related to the broadcasting user on the social-networking system. As an example and not by way of limitation, the social-networking system may selectively send the notification to friends of the broadcasting user, users within a specified degree of separation from the broadcasting user, or users with an above-threshold affinity coefficient with the broadcasting user. With or without seeing the notification, one or more users may cause their client systems to send requests to access the live-broadcast session to the social-networking system. Although this disclosure describes sending a request to access a live-broadcast session in a particular manner, this disclosure contemplates sending a request to access a live-broadcast session in any suitable manner.

In particular embodiments, the live-broadcast service may determine a format for the media stream to be received by the client system associated with a viewing user. The determination may be based at least in part on availability of the media stream in the video format or the audio format and a network connectivity status associated with the client system. The determination may also be based on an explicit input received by the client system specifying a particular format. The determination may be performed prior to a live-broadcast session or dynamically during the live-broadcast session. The social-networking system may send information associated with a live-broadcast session to one or more client systems receiving a notification about the live-broadcast session or one or more client systems requesting to access the live-broadcast session. The information may comprise, for example, a title of the live-broadcast session, identification information of the broadcasting user, information about one or more other entities related to the live-broadcast session, the scheduled or actual starting time of the live-broadcast session, an expected duration of the live-broadcast session, other suitable information, or any combination thereof. In particular embodiments, the information sent from the social-networking system to the client systems associated with the viewing users may further comprise information about one or more formats (e.g., audio, video) that the live-broadcast session is made available in. The formats information may be obtained based on an explicit selection by the broadcasting user or an analysis of the outgoing media stream received from the client system associated with the broadcasting user.

As an example and not by way of limitation, the social-networking system may receive, from the client system associated with the broadcasting user, information about selection of the audio mode along with other information to initiate the live-broadcast session. The social-networking system may determine that, based on the selection, the only format that the live-broadcast session will be available in is the audio format. It may forward such information to one or more client systems associated with potential viewing users. As another example and not by way of limitation, the social-networking system may determine that a media stream received from the client system associated with the broadcasting user comprises both audio data and video data. It may send information to one or more client systems associated with potential viewing users indicating that the live-broadcast session is available in both audio and video formats. The client system associated with a viewing user may only receive the media stream in a format that is available.

In particular embodiments, the network connectivity status associated with the client system of a viewing user may comprise, for example, a bandwidth of a network connection of the client system, a network type of the network connection of the client system, a data usage transfer limit with respect to a specified network available to the client system, a data usage status of the client system with respect to the specified network, another suitable factor of the network connectivity status, or any combination thereof. The network connectivity status may be determined by the client system or the social-networking system. As an example and not by way of limitation, the client system may receive information associated with a data usage transfer limit with respect to a particular network (e.g., 4G LTE) from a data service provider associated with the network. The data usage transfer limit may correspond to a particular timeframe specified by the data service provider. The client system may further track an amount of data usage within the specified timeframe based on user activities on the client system. As another example and not by way of limitation, the social-networking system may detect, measure, or record a packet rate or a packet-loss rate associated with communications with the viewing user's client system over time. It may determine a bandwidth associated with the connection between the social-networking system and the client system based at least in part on the packet rate or the packet-loss rate. Information about the network connectivity status of the client system may be exchanged between the client system and the social-networking system. The determination of the format of received media stream may be performed by the live-broadcast service as executed either by the client system or the social-networking system.

As an example and not by way of limitation, the live-broadcast service may provide a live-broadcast session in the video mode. The social-networking system may receive from a client system associated with a broadcasting user a media stream comprising both audio and video data and make the media stream available to one or more client systems associated with one or more viewing users. The client system associated with a particular viewing user may determine that a bandwidth of a network connection between the client system and the social-networking system is greater than a specified threshold value. This may imply that the network connection is fast enough to allow smooth transmission of the media stream from the social-networking system to the client system. The client system may prompt the viewing user to freely choose either the video format or the audio format of the media stream and request and receive the media stream from the social-networking system in the chosen format.

As another example and not by way of limitation, the client system associated with the viewing user may initially access a live-broadcast session in the video mode. During the live-broadcast session, due to a drop in a bandwidth of the network connectivity of the broadcasting user's client system, it may begin to send an audio stream to the social-networking system. Since the media stream is now only available in the audio format, the client system associated with the viewing user is forced to receive the media stream comprising only audio data from the social-networking system.

As another example and not by way of limitation, the client system associated with the viewing user may initially access a live-broadcast session in the video mode. During the live-broadcast session, a bandwidth associated with the client system's network connection may be determined to drop below a specified threshold value. If the determination is performed by the client system, the client system may update a request to the social-networking system to receive only an audio component of a media stream associated with the live-broadcast session. Alternatively, if the determination is performed by the social-networking system, the social-networking system may automatically modify the format of the media stream it provides to the client system and begin to send an audio stream to the client system.

As yet another example and not by way of limitation, the live-broadcast service may provide a live-broadcast session in both the audio mode and the video mode. The client system associated with a viewing user may determine that the client system is connected to a high-cost network (e.g., a cellular network) and a high percentage of the data usage allowance for the viewing user has been used. The client system may thereby determine to receive the media stream associated with the live-broadcast session in the audio format. Although this disclosure describes determining a format for a media stream to be received in a particular manner, this disclosure contemplates determining a format for a media stream to be received in any suitable manner.

Figure 5A:
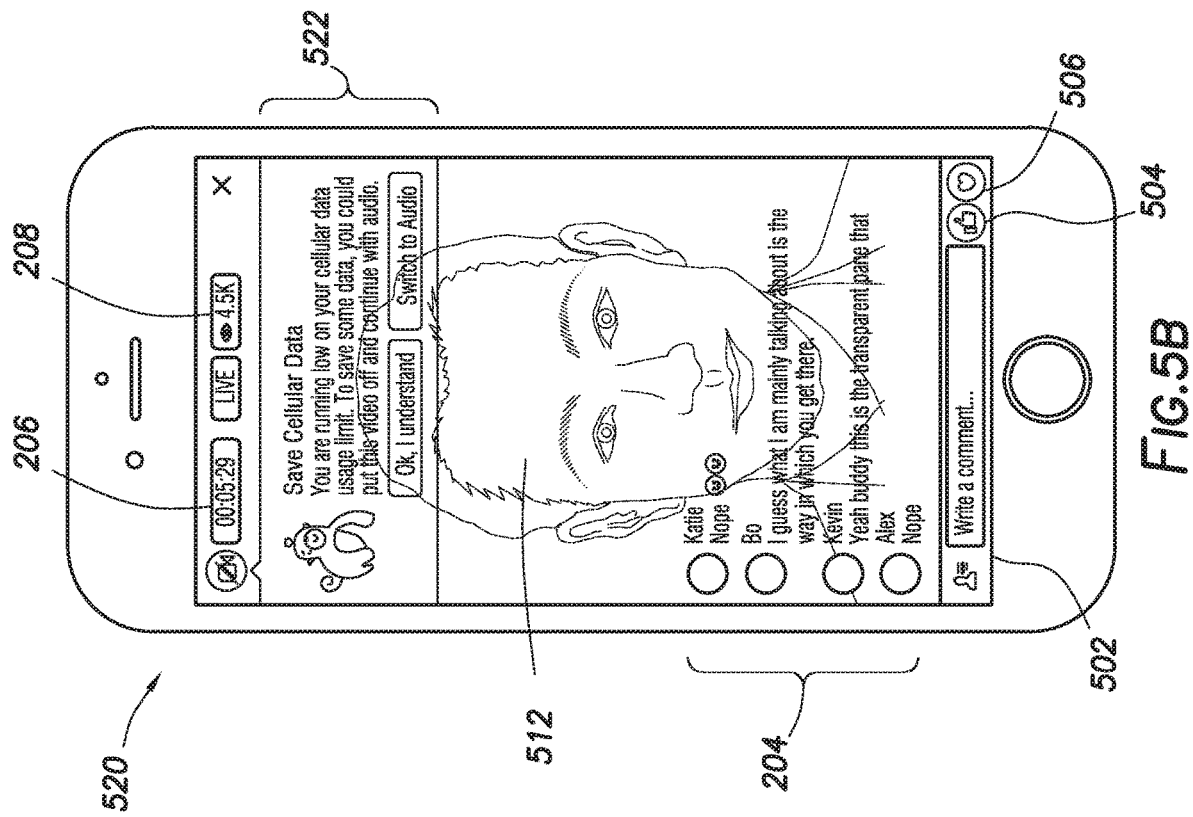

In particular embodiments, the client system may provide the media stream in the determined format to the viewing user. The media stream may be provided in a user interface associated with the live-broadcast session. FIGS. 5A-5D illustrate example live-broadcast interfaces provided for display on a client system associated with a viewing user. As shown in FIG. 5A, the client system associated with the viewing user may access a live-broadcast session in the video mode. The client system may provide for display a live-broadcast interface 510 associated with the live-broadcast session. The live-broadcast interface 510 may comprise a visual representation 512 of the media stream. In the video mode, the visual representation 512 may comprise the video stream received from the social-networking system. The live-broadcast interface 510 may comprise a reaction field 204 displaying reaction information associated with one or more viewing users of the live broadcast, a timer 206 indicating a length of time that the current live-broadcast session has lasted, and a headcount icon 208 indicating a number of users viewing the live broadcast. The live-broadcast interface 510 may further comprise a comment field 502 allowing the viewing user to input comments on the live broadcast, a like button 504 for the viewing user to interact with to express "like" for the live broadcast, and a emoticon button 506 for the viewing user to interact with to input one or more emoticons in response to the live broadcast.

Figure 5B:
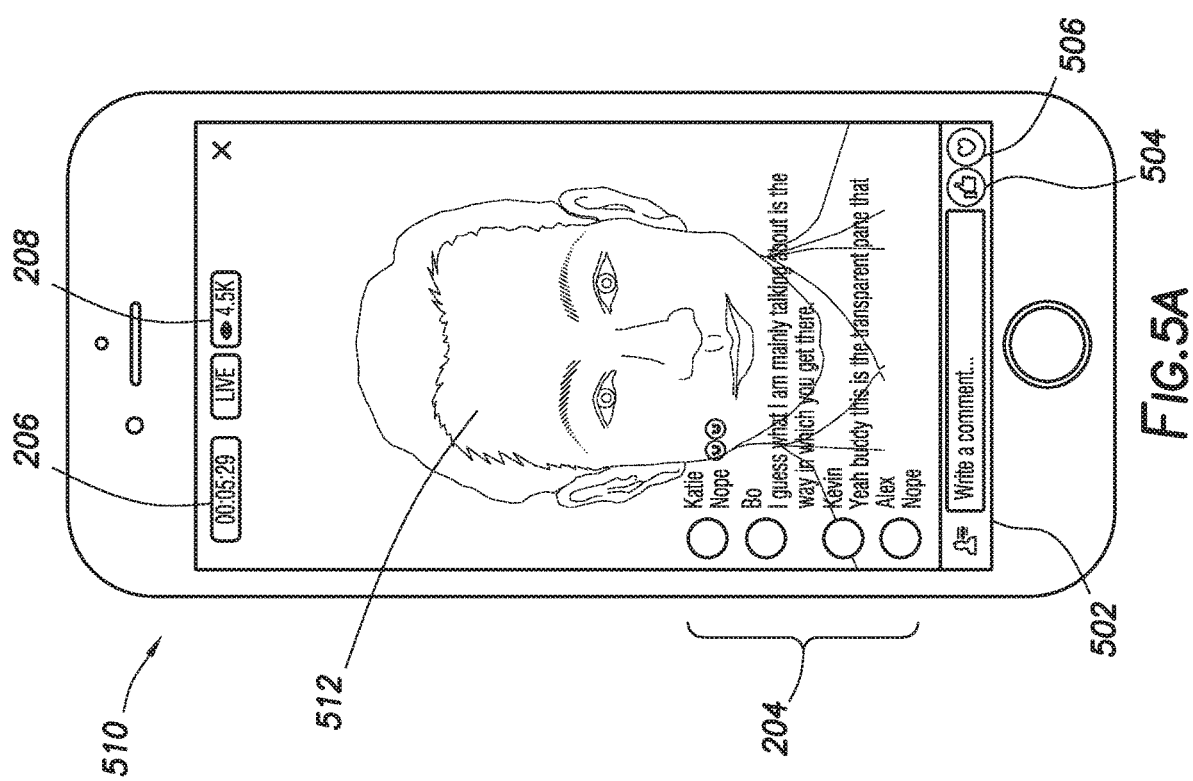

In particular embodiments, the client system associated with the viewing user may determine a type of network it is connected to. It may determine that a data usage transfer limit applies to this type of network. The client system may have received information about the data usage allowance for the viewing user within a specified timeframe from the data service provider or the viewing user. It may further determine or receive a data usage status of the viewing user, which may comprise an amount of data that has been used within the specified timeframe for the determined type of network. In particular embodiments, based on the aforementioned information, the client system may determine that an amount of data usage available within a specified period is less than a data usage threshold. In this case, the client system may notify the viewing user of the data usage status and switch to receiving a media stream associated with a live-broadcast session in the audio format. As shown in FIG. 5B, upon determining that the viewing user is running low on cellular data, the client system may provide for display in the live-broadcast interface 520 a message 522. The message 522 may inform the user about the data usage status and prompt the user to choose to switch to the audio mode to save data. For example, the message 522 may allow the viewing user to click on the "OK, I understand" button to stay with the video mode or to click on the "Switch to Audio" button to switch to the audio mode. If the user clicks on the "Switch to Audio" button, the client system may send an updated request to the social-networking system to begin receiving only an audio component of the media stream. In response to the viewing user's input, the client system may transition from the live-broadcast interface 520 to the live-broadcast interface 530 as shown in FIG. 5C.

FIG. 5C illustrates a live-broadcast interface 530 associated with an audio mode of the live-broadcast session. The live-broadcast interface 530 may replace the video stream 512 with a visual representation field 532 comprising, for example, a cover image associated with the broadcasting user and an animation associated with the audio stream. The cover image may be a pre-stored image associated with the broadcasting user or a screenshot of the last frame of the previously-displayed video stream. The animation associated with the audio stream may be of a type selected by the broadcasting user or the viewing user. It may alternatively be automatically selected based on the capabilities and status of the client system associated with the viewing user. Specifically, the live-broadcast service may select a simpler type of animation if the processing capabilities of the client system are limited; it may select a type of animation with complexity, high fidelity, or quick reactiveness if the processing capabilities of the client system are sufficient. The visual representation field 532 may occupy a smaller area than the video stream 512 within the live-broadcast interface 530. This may leave space for a live reaction field 534 displaying one or more emoticons inputted by one or more users viewing the live broadcast. The live-broadcast interface 530 may further display a message 536 informing the viewing user that the video streaming has been switched off to save data.

In particular embodiments, a live-broadcast session may be associated with more than one broadcasting users. One of the broadcasting users may be a "host" of the live-broadcast session, whose client system initially sends information to the social-networking system to initiate the live-broadcast session. One or more other broadcasting users may be "guests" to the live-broadcast session. A client system associated with each of the broadcasting users may generate an outgoing media stream and send the outgoing media stream to the social-networking system. The determination of the format for the outgoing media stream associated with each of the broadcasting user may be performed by the social-networking system or a client system of the respective broadcasting user. The format may be determined based at least in part on a network connectivity status associated with the client system or an input signal to the client system indicating selection of a particular format. The formats of the outgoing media streams associated with different broadcasting users may be the same or different. As an example and not by way of limitation, the media streams associated with the broadcasting users may all be in the video format or the audio format. As another example and not by way of limitation, the media streams associated with one or more of the broadcasting users may be in the video format, while the media streams associated with one or more other broadcasting users may be in the audio format. Client systems associated with one or more viewing users of the live-broadcast session may simultaneously receive media streams generated by client systems associated with the host and the guests of the live-broadcast session in their respective formats. As shown in FIG. 5D, the live-broadcast interface 540 may comprise a visual representation field 542 that comprises cover images associated with both a host and a guest of the live-broadcast session. It may further comprise identification information associated with the guest. In particular embodiments, the live-broadcast interface 540 may alternatively display a combination of video streams from the host and one or more guests or a combination of video stream and audio animation from the hosts and guests. Selection of the formats of the media streams may be based on availability of the media streams in different formats and network connectivity status associated with the client systems of the broadcasting users and the viewing users. Although FIGS. 5A-5D illustrate particular user interfaces provided for display on a client system associated with a viewing user, this disclosure contemplates any suitable user interfaces provided for display on a client system associated with a viewing user.

In particular embodiments, to provide a user interface associated with a live-broadcast session to a viewing user, a client system associated with the viewing user may execute an application associated with the live-broadcast session either in the foreground or in the background. The application may be, for example, an application of general functionality (e.g., a web browser), an application associated with the social-networking system, or an application associated with the live-broadcast service and specifically configured to provide live-broadcast sessions. In particular embodiments, the client system may execute the application in a foreground state. In this case, the application may provide information to display a maximized user interface corresponding to the live-broadcast session. Examples of such a maximized user interface are illustrated by FIGS. 5A-5D.

Alternatively, the client system may execute the application in a background state. In this case, the application may provide information to display a minimized user interface corresponding to the live-broadcast session. A live-broadcast session in the audio mode may be particularly appropriate when the viewing user's attention is devoted to an activity other than engaging the live-broadcast session (e.g., driving, working out, using another application on the client system). The user interface displayed to the viewing user may be customized for the needs related to such use cases. In particular embodiments, when the application associated with the live-broadcast session is sent to the background of the client system, the application may automatically cause the live-broadcast session to switch to the audio mode if the live-broadcast session was in the video mode. The application may continue to run in the background and provide information to display a user interface corresponding to the live-broadcast session.

In particular embodiments, when the viewing user is not actively engaging the live-broadcast session, the user interface corresponding to the live-broadcast session may be simplified and included in, for example, a lock-screen interface, a notification bar, or another portion of a display associated with the client system. Such arrangements may allow the viewing user to use another application while listening to the live-broadcast session or may avoid unnecessary distractions to the viewing user. These variations of the user interface may comprise one or more elements of the maximized user interface and not comprise one or more other elements of the maximized user interface. The size and appearance of particular elements may also be modified. In particular embodiments, a simplified user interface may not comprise a field containing reaction information associated with the media stream (e.g., reaction field 204, live reaction field 534). When such a user interface is displayed, the live-broadcast service may use alternative signals to indicate reactions to the live broadcast. As an example and not by way of limitation, the live-broadcast service may use particular sound effects to indicate reactions to the live broadcast. For example, the live-broadcast service may play a sound corresponding to an air bubble each time a reaction (e.g., a comment, a like, an emoticon) is inputted for the live broadcast. As another example and not by way of limitation, the live-broadcast service may use a brightness of the portion of the display corresponding to the simplified user interface to represent an amount of reactions to the live broadcast. The portion may be made bright if there are a large number of reactions to the live broadcast and dark if there are not many reactions. Although this disclosure describes displaying a particular simplified user interface associated with a live-broadcast session in a particular manner, this disclosure contemplates displaying any suitable simplified user interface associated with a live-broadcast session in any suitable manner.

FIGS. 6A-6B illustrate example simplified user interfaces displayed on a client system associated with a viewing user of a live-broadcast session. As shown in FIG. 6A, if the client system enters into a locked state during a live-broadcast session, it may continue playing at least an audio component of the media stream associated with the live-broadcast session. The client system may also display a simplified interface 610 in a locked screen. The interface 610 may comprise a title associated with the live-broadcast session, a volume bar 614 allowing the viewing user to adjust the volume of the audio stream, and a visual representation 616 associated with the live-broadcast session. As shown in FIG. 6B, if an application different from the one associated with the live-broadcast session is opened on the client system associated with the viewing user, the client system may provide for display the user interface 620. A portion of the user interface 620 may be assigned to display a simplified interface 622 associated with the live-broadcast session. The simplified interface 622 may indicate the identity of the broadcasting user. Although FIGS. 6A-6B illustrate particular simplified user interfaces associated with a live-broadcast session, this disclosure contemplates any suitable simplified user interfaces associated with a live-broadcast session.

Figure 7A:
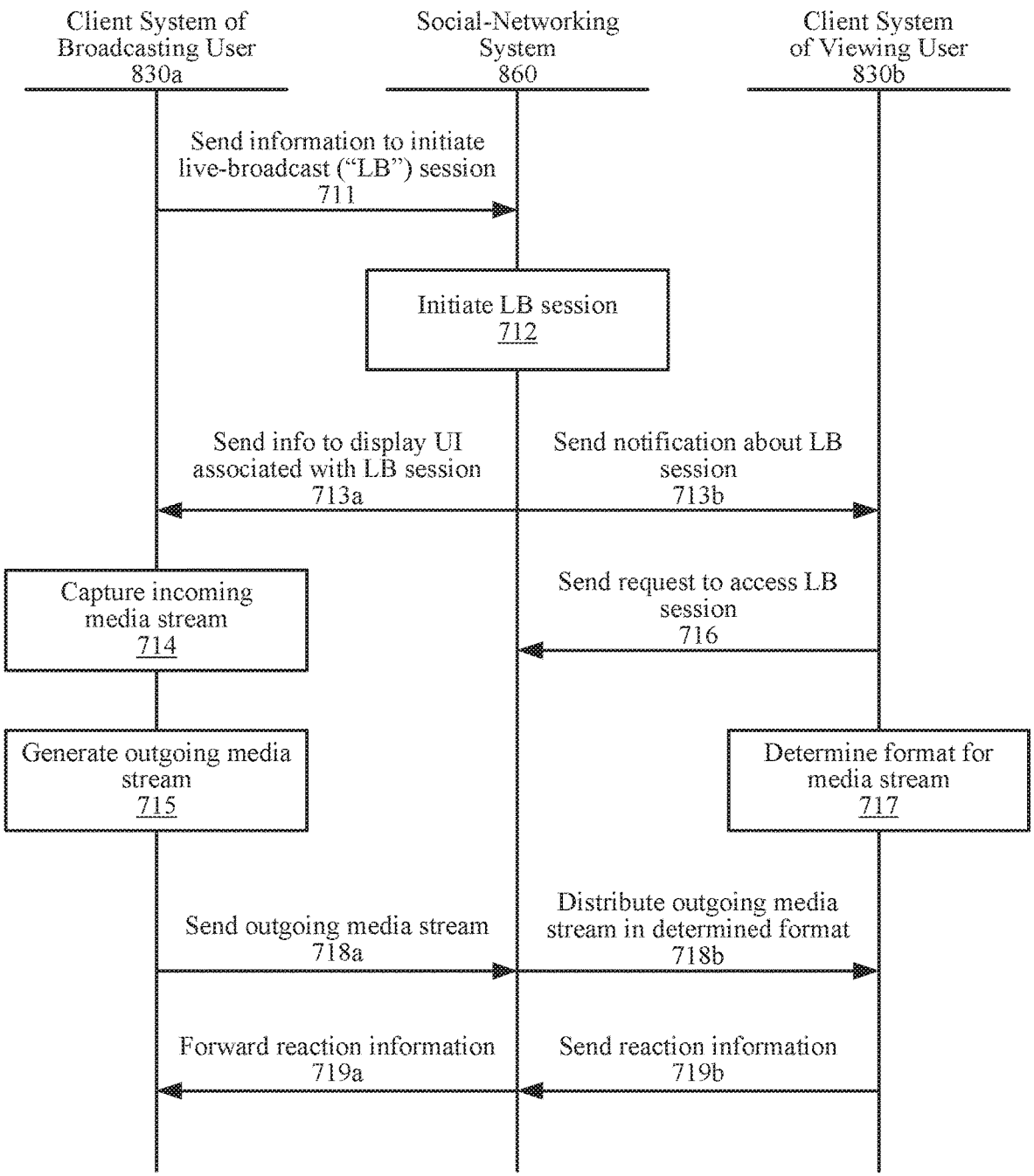
FIG. 7A illustrates an example method for providing a live-broadcast session allowing a broadcasting user to broadcast a media stream to one or more viewing users.

FIG. 7A illustrates an example method for providing a live-broadcast session allowing a broadcasting user to broadcast a media stream to one or more viewing users. As shown in FIG. 7A, the broadcasting user may be associated with a client system 830a; one of the viewing users may be associated with a client system 830b. The client systems 830 may be connected to the social-networking system 860 via one or more network connections. At step 711, the client system 830a associated with the broadcasting user may send information to the social-networking system 860 to initiate a live-broadcast session. In response to the information received from the client system 830a, the social-networking system 860 may initiate a live-broadcast session at step 712. At step 713a, the social-networking system 860 may send and the client system 830a may receive information to display a user interface associated with the live-broadcast session. At step 713b, in parallel with step 713a, the social-networking system may send and the client system 830b may receive a notification about the live-broadcast session. At step 714, the client system 830a may capture an incoming media stream in association with the live-broadcast session initiated at step 712. The client system 830a may then generate an outgoing media stream based on the incoming media stream at step 715. This outgoing media stream may be identical to the incoming media stream. Alternatively, the outgoing media stream may comprise part of the data (e.g., audio data only) of the incoming media stream. In parallel and at step 716, the client system 830b may send a request to access the live-broadcast session in response to the notification received from the social-networking system 860. At step 717, the client system 830b may determine a format (e.g., audio, video) for the media stream to be received in association with the live-broadcast session. This determination may be based on information received from the social-networking system 860 indicating one or more formats available for the outgoing media stream generated by the client system 830a at step 715 or a network connectivity status of the client system 830b. At step 718a, the client system 830a may send the generated outgoing media stream to the social-networking system 860. At substantially the same time or with a short delay, at step 718b, the social-networking system 860 may distribute the media stream to the client system 830b in the format determined by the client system 830b. In particular embodiments, the client system 830a may bypass the social-networking system 860 and directly send the media stream to the client system 830a at step 718. The viewing user may have one or more reactions to the live broadcast and may generate corresponding reaction information. At step 719b, the client system 830b may send such reaction information to the social-networking system 860. At step 719a, the social-networking system 860 may forward the reaction information for display in the user interface displayed on the client system 830a.

Particular embodiments may repeat one or more steps of the method of FIG. 7A, where appropriate. Although this disclosure describes and illustrates particular steps of the method of FIG. 7A as occurring in a particular order, this disclosure contemplates any suitable steps of the method of FIG. 7A occurring in any suitable order. Moreover, although this disclosure describes and illustrates an example method for providing a live-broadcast session including the particular steps of the method of FIG. 7A, this disclosure contemplates any suitable method for providing a live-broadcast session including any suitable steps, which may include all, some, or none of the steps of the method of FIG. 7A, where appropriate. Furthermore, although this disclosure describes and illustrates particular components, devices, or systems carrying out particular steps of the method of FIG. 7A, this disclosure contemplates any suitable combination of any suitable components, devices, or systems carrying out any suitable steps of the method of FIG. 7A.

Figure 7B:
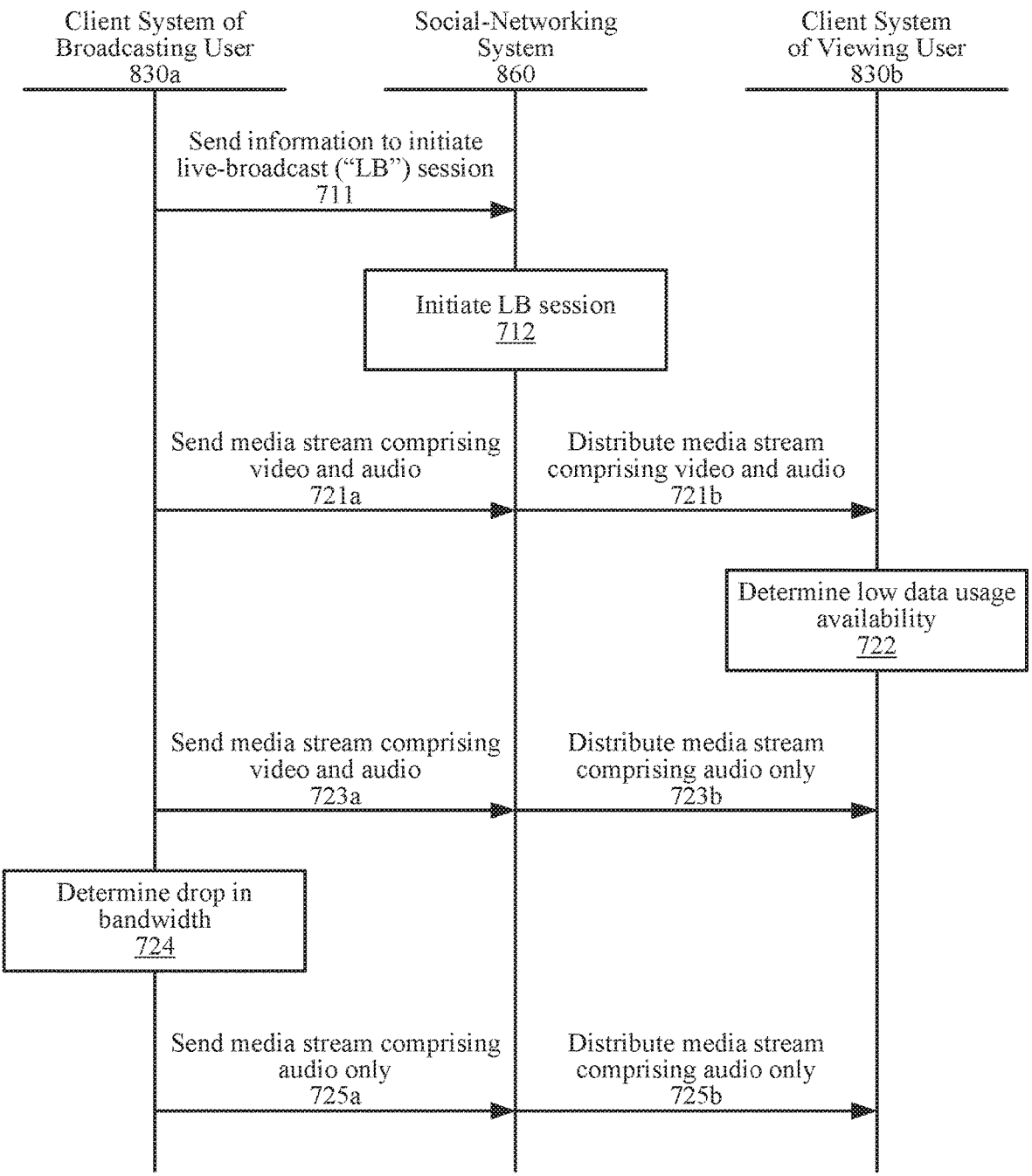
FIG. 7B illustrates an example method for adjusting a format of a media stream associated with a live-broadcast session.

FIG. 7B illustrates an example method for adjusting a format of a media stream associated with a live-broadcast session. At step 711, the client system 830a associated with the broadcasting user may send information to the social-networking system 860 to initiate a live-broadcast session. In response to the information received from the client system 830a, the social-networking system 860 may initiate a live-broadcast session at step 712. At step 721a, in association with the live-broadcast session, the client system 830a may initially send a media stream comprising both video and audio data to the social-networking system 860. At step 721b, the client system 830b may receive the media stream comprising both video and audio data from the social-networking system 860. At step 722, the client system 830b may determine a type of network it is connected to and determine that an amount of data usage allowed for this network is getting low. The client system 830b may switch to receiving the media stream in the audio format to save data and send information corresponding to this switch to the social-networking system. In response to such information, although the social-networking system 860 still receives the media stream comprising both video and audio data from the client system 830a at step 723a, it may send only the audio component of the media stream to the client system 830b at step 723b. At step 724, the client system 830a may determine that the bandwidth of a network connection associated with the client system 830a drops below a threshold value and such a bandwidth is not enough to sustain smooth transmission of video data to the social-networking system 860 in real time. The client system 830a may thereby switch the live-broadcast session to the audio mode. At step 725a, the client system 830a may send a media stream comprising only audio data to the social-networking system 860. At step 725b, the social-networking system 860 has no choice but to forward the audio-only media stream to the client system 830b. At this point, one or more client systems associated with one or more other viewing users may be forced to switch to an audio mode because a video stream is no longer available.

Particular embodiments may repeat one or more steps of the method of FIG. 7B, where appropriate. Although this disclosure describes and illustrates particular steps of the method of FIG. 7B as occurring in a particular order, this disclosure contemplates any suitable steps of the method of FIG. 7B occurring in any suitable order. Moreover, although this disclosure describes and illustrates an example method for adjusting a format of a media stream associated with a live-broadcast session including the particular steps of the method of FIG. 7B, this disclosure contemplates any suitable method for adjusting a format of a media stream associated with a live-broadcast session including any suitable steps, which may include all, some, or none of the steps of the method of FIG. 7B, where appropriate. Furthermore, although this disclosure describes and illustrates particular components, devices, or systems carrying out particular steps of the method of FIG. 7B, this disclosure contemplates any suitable combination of any suitable components, devices, or systems carrying out any suitable steps of the method of FIG. 7B.

Figure 8:
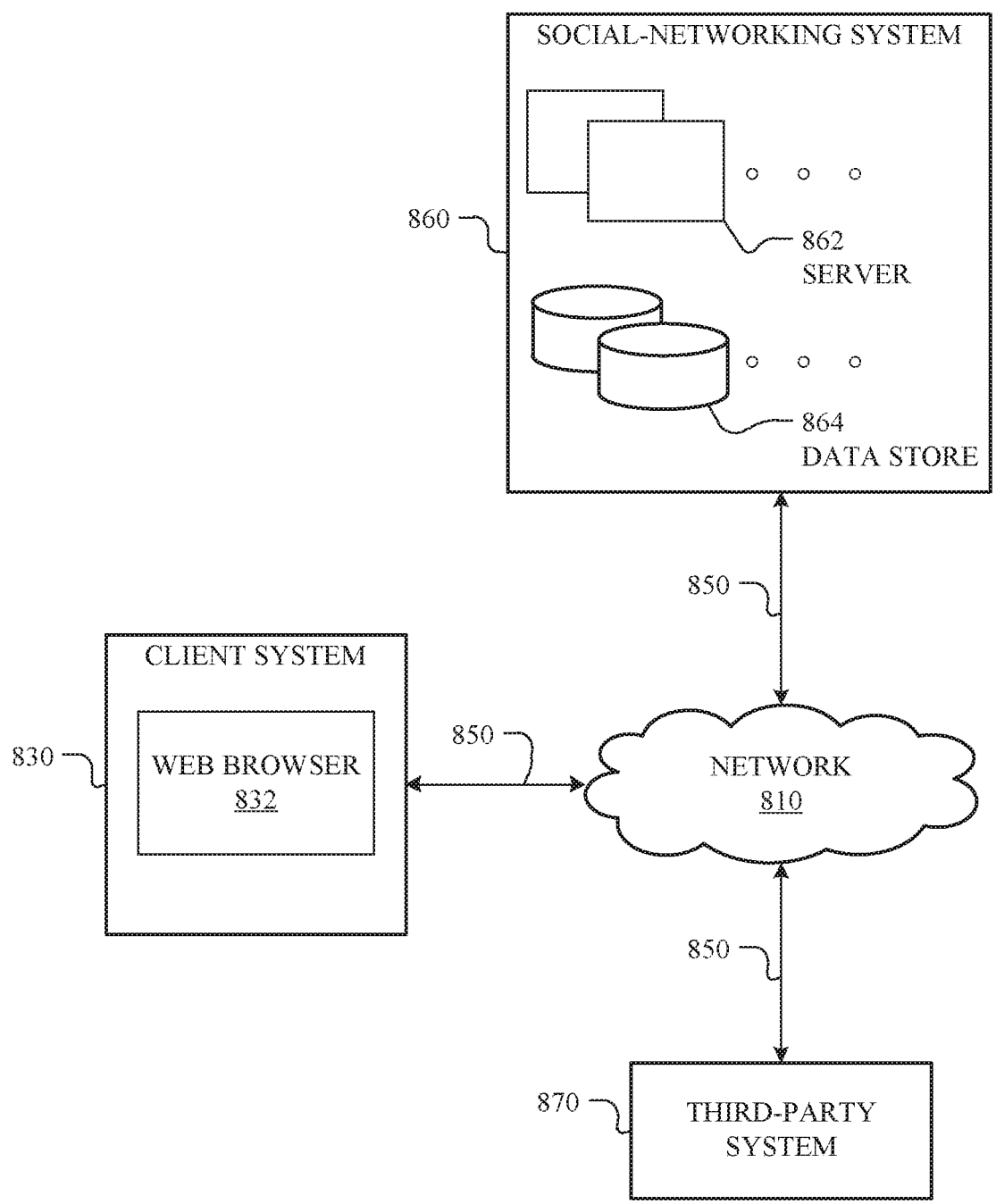
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
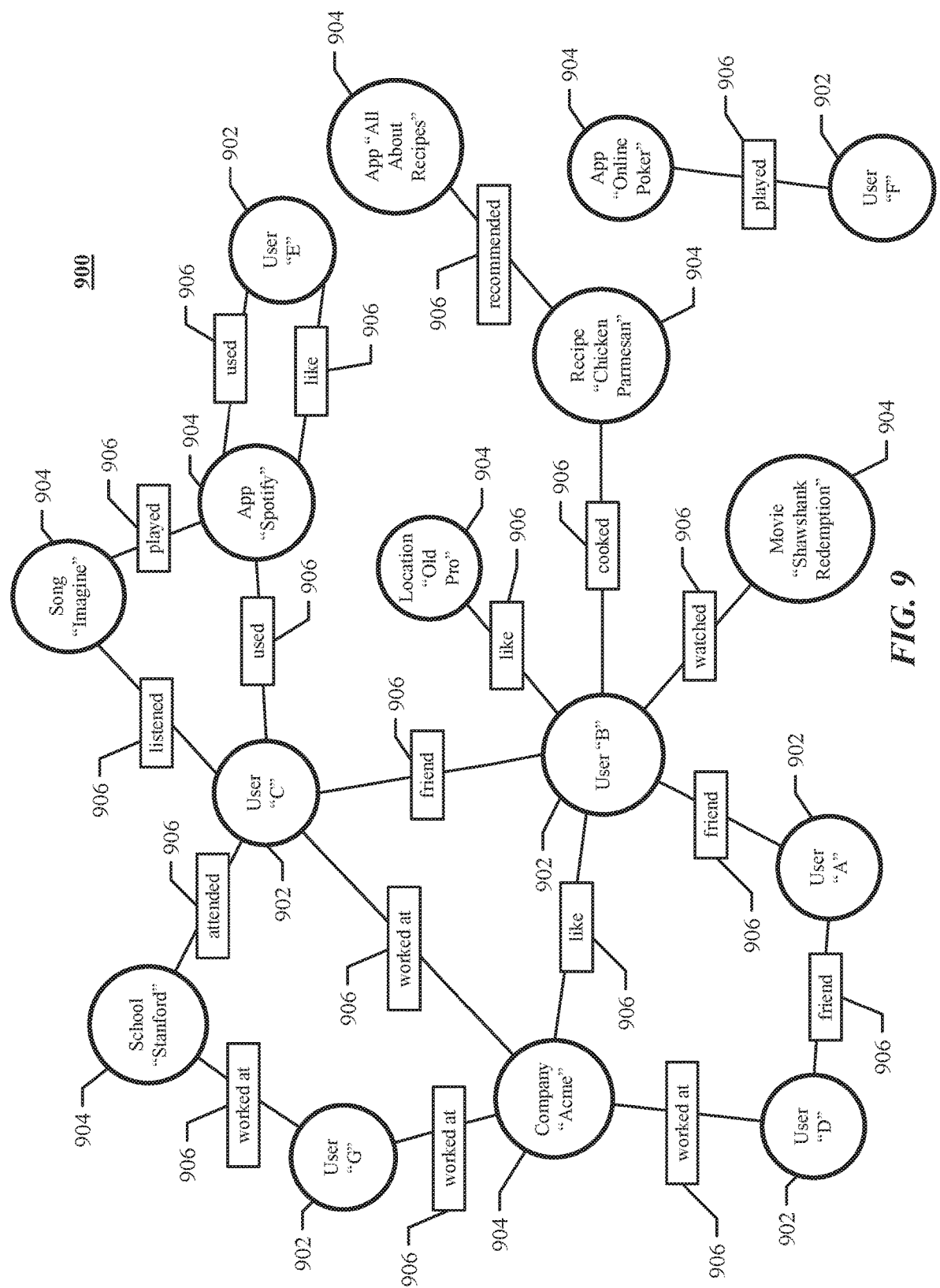
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 860 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity) for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 10:
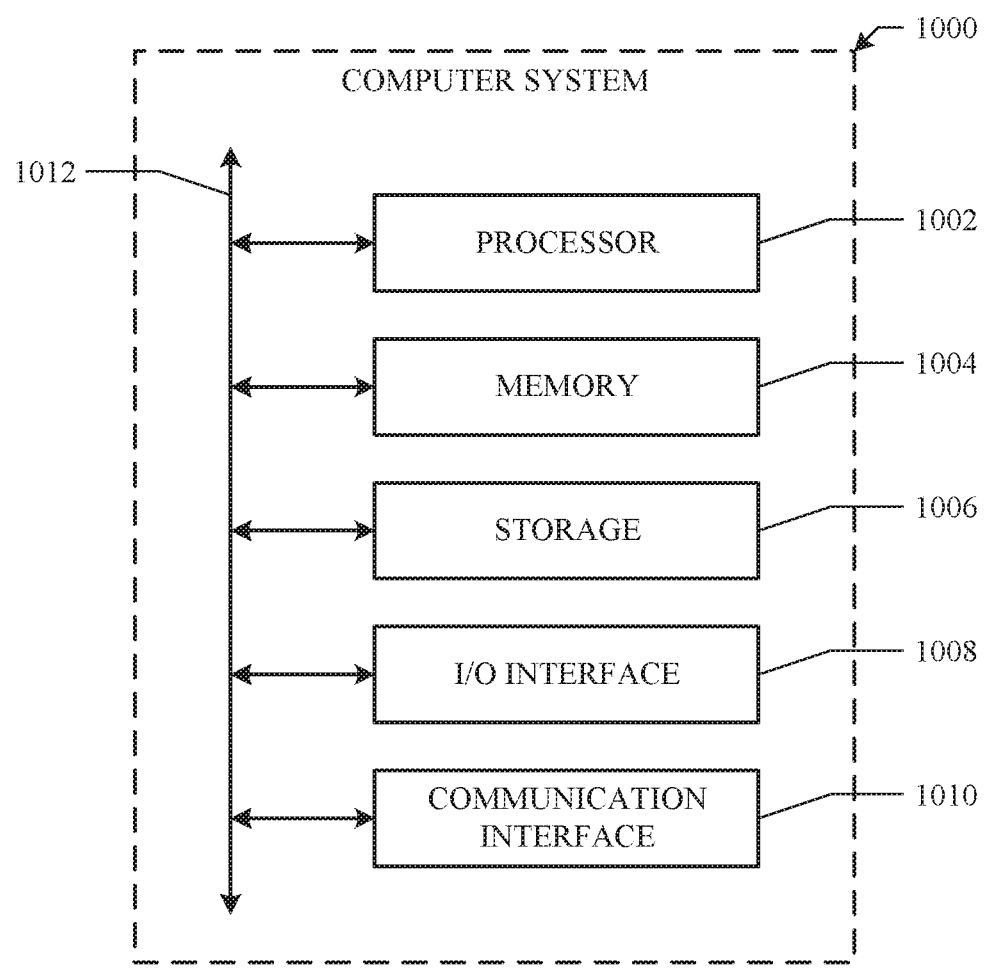
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006.

Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a first client system associated with a first user of a social-networking system, sending, to the social-networking system, information to initiate a live-broadcast session for distribution of a media stream using the social-networking system;
    by the first client system, capturing an incoming media stream in association with the live-broadcast session;

by the first client system, generating an outgoing media stream based on the incoming media stream, wherein the outgoing media stream is generated in an audio-only mode based at least in part on a network connectivity status associated with the first client system;

by the first client system, when generating the outgoing media stream in the audio-only mode:
  measuring two or more bandwidth values associated with the network connectivity status of the first client system, each bandwidth value being associated with a time of its measurement; and
  determining that two or more of the bandwidth values within a period of time are each greater than a threshold bandwidth value;

by the first client system, in response determining that the two or more of the bandwidth values within the period of time are each greater than the threshold bandwidth value, further generating the outgoing media stream in a video mode;

by the first client system, sending the outgoing media stream to the social-networking system; and by the first client system, providing information to display a user interface associated with the live-broadcast session, wherein the user interface comprises a visual representation associated with the outgoing media stream.

2. The method of claim 1, further comprising, by the first client system, further generating the outgoing media stream in a particular mode indicated by an input signal received by the first client system.

3. The method of claim 1, wherein the incoming media stream comprises audio data and video data, and wherein the generating the outgoing media stream comprises removing the video data from the incoming media stream and retaining the audio data of the incoming media stream.

4. The method of claim 3, further comprising:
  recording the audio data and the video data of the incoming media stream;
  storing the recorded data in one or more data stores associated with the first client system; and
  sending, to the social-networking system for display in a web interface associated with the first user, a media object comprising the stored data associated with the incoming media stream.

5. The method of claim 1, further comprising, by the first client system:
  receiving, from the social-networking system, instructions to distribute the outgoing media stream to one or more second client systems; and
  sending the outgoing media stream to the one or more second client systems based on the received instructions.

6. The method of claim 1, wherein the user interface further comprises reaction information associated with one or more second users of the social-networking system.

7. The method of claim 6, wherein the reaction information comprises:
  one or more graphic emoticons inputted to one or more of the second client systems;
  one or more comments inputted to one or more of the second client systems; or
  one or more indications of likes by the second users.

8. One or more computer-readable non-transitory storage media embodying software that is operable when executed to:
  send, from a first client system associated with a first user of a social-networking system to the social-networking system, information to initiate a live-broadcast session for distribution of a media stream using the social-networking system;
  capture an incoming media stream in association with the live-broadcast session;
  generate an outgoing media stream based on the incoming media stream, wherein the outgoing media stream is generated in an audio-only mode based at least in part on a network connectivity status associated with the first client system;
  when generating the outgoing media stream in the audio-only mode:
    measure two or more bandwidth values associated with the network connectivity status of the first client system, each bandwidth value being associated with a time of its measurement; and
    determine that two or more of the bandwidth values within a period of time are each greater than a threshold bandwidth value;
  in response determining that the two or more of the bandwidth values within the period of time are each greater than the threshold bandwidth value, further generate the outgoing media stream in a video mode;
  send the outgoing media stream to the social-networking system; and
  provide information to display a user interface associated with the live-broadcast session, wherein the user interface comprises a visual representation associated with the outgoing media stream.

9. The media of claim 8, wherein the software is further operable when executed to further generating the outgoing media stream in a particular mode indicated by an input signal received by the first client system.

10. The media of claim 8, wherein the incoming media stream comprises audio data and video data, and wherein the generating the outgoing media stream comprises removing the video data from the incoming media stream and retaining the audio data of the incoming media stream.

11. The media of claim 8, wherein the software is further operable when executed to:
  receive, from the social-networking system, instructions to distribute the outgoing media stream to one or more second client systems; and
  send the outgoing media stream to the one or more second client systems based on the received instructions.

12. The media of claim 8, wherein the user interface further comprises reaction information associated with one or more second users of the social-networking system.

13. A system comprising: one or more processors; and a memory coupled to the processors comprising instructions executable by the processors, the processors being operable when executing the instructions to:
  send, from a first client system associated with a first user of a social-networking system to the social-networking system, information to initiate a live-broadcast session for distribution of a media stream using the social-networking system;
  capture an incoming media stream in association with the live-broadcast session;
  generate an outgoing media stream based on the incoming media stream, wherein the outgoing media stream is generated in an audio-only mode based at least in part on a network connectivity status associated with the first client system;
  when generating the outgoing media stream in the audio-only mode:

measure two or more bandwidth values associated with the network connectivity status of the first client system, each bandwidth value being associated with a time of its measurement; and determine that two or more of the bandwidth values within a period of time are each greater than a threshold bandwidth value;

in response determining that the two or more of the bandwidth values within the period of time are each greater than the threshold bandwidth value, further generate the outgoing media stream in a video mode;

send the outgoing media stream to the social-networking system; and provide information to display a user interface associated with the live-broadcast session, wherein the user interface comprises a visual representation associated with the outgoing media stream.

14. The system of claim 13, wherein the processors are further operable when executing the instructions to further generating the outgoing media stream in a particular mode indicated by an input signal received by the first client system.

15. The system of claim 13, wherein the incoming media stream comprises audio data and video data, and wherein the generating the outgoing media stream comprises removing the video data from the incoming media stream and retaining the audio data of the incoming media stream.

16. The system of claim 13, wherein the processors are further operable when executing the instructions to:

receive, from the social-networking system, instructions to distribute the outgoing media stream to one or more second client systems; and send the outgoing media stream to the one or more second client systems based on the received instructions.

17. The system of claim 13, wherein the user interface further comprises reaction information associated with one or more second users of the social-networking system.

* * * * *